(12) United States Patent
Patel et al.

(10) Patent No.: US 11,757,977 B2
(45) Date of Patent: *Sep. 12, 2023

(54) RULE-BASED ACTION TRIGGERING IN A PROVIDER NETWORK

(71) Applicant: Amazon Technologies, Inc., Seattle, WA (US)

(72) Inventors: Mihir Rajendrabhai Patel, Seattle, WA (US); Mustafa Ugur Torun, Seattle, WA (US); Jesse Marcus Dougherty, West Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 615 days.

This patent is subject to a terminal disclaimer.

(21) Appl. No.: 16/791,149

(22) Filed: Feb. 14, 2020

(65) Prior Publication Data
US 2020/0186594 A1  Jun. 11, 2020

Related U.S. Application Data

(63) Continuation of application No. 14/529,097, filed on Oct. 30, 2014, now Pat. No. 10,567,476.

(51) Int. Cl.
*H04L 12/24* (2006.01)
*H04L 29/08* (2006.01)
(Continued)

(52) U.S. Cl.
CPC .......... *H04L 67/10* (2013.01); *H04L 41/0681* (2013.01); *G06N 5/025* (2013.01); *H04L 41/0631* (2013.01)

(58) Field of Classification Search
CPC .......................... H04L 67/10; H04L 41/0681
See application file for complete search history.

(56) References Cited

U.S. PATENT DOCUMENTS 6,308,216 B1  10/2001  Goldszmidt et al.
6,636,521 B1  10/2003  Giulianelli
(Continued)

FOREIGN PATENT DOCUMENTS

CN   101427219 A   5/2009
CN   102782736 A   11/2012
(Continued)

OTHER PUBLICATIONS

Office Action dated May 21, 2021 in Australian Patent Application No. 2020223693, Amazon Technologies, Inc., pp. 1-5.
(Continued)

*Primary Examiner* — Nazia Naoreen
(74) *Attorney, Agent, or Firm* — Robert C. Kowert; Kowert, Hood, Munyon, Rankin & Goetzel, P.C.

(57) ABSTRACT

Methods, systems, and computer-readable media for implementing rule-based triggering in a provider network are disclosed. When conditions are met for one or more triggers, one or more rules that comprise the one or more triggers are determined. The conditions are determined in a provider network comprising a plurality of resources. One or more actions are determined in the one or more rules that comprise the one or more triggers. The one or more actions are performed, comprising modifying one or more of the resources in the provider network.

20 Claims, 20 Drawing Sheets

(51) Int. Cl.
*H04L 67/10* (2022.01)
*H04L 41/0681* (2022.01)
*G06N 5/025* (2023.01)
*H04L 41/0631* (2022.01)

(56) References Cited

U.S. PATENT DOCUMENTS

| | | | |
|---|---|---|---|
| 7,702,724 | B1 | 4/2010 | Brydon et al. |
| 7,886,001 | B2 | 2/2011 | Asthana et al. |
| 7,991,778 | B2 | 8/2011 | Hull et al. |
| 8,291,453 | B2 | 10/2012 | Boortz |
| 8,332,365 | B2 | 12/2012 | McAlister et al. |
| 8,484,185 | B2 | 7/2013 | Fra'et al. |
| 8,577,976 | B2 * | 11/2013 | Bhasin .............. G06F 9/546 709/206 |
| 8,612,599 | B2 * | 12/2013 | Tung .............. H04L 41/5006 709/224 |
| 8,695,075 | B2 | 4/2014 | Anderson et al. |
| 8,719,605 | B2 | 5/2014 | Chakra et al. |
| 10,985,970 | B1 * | 4/2021 | Goyal .............. G06F 16/2477 |
| 2003/0179227 | A1 | 9/2003 | Ahmad et al. |
| 2008/0109884 | A1 | 5/2008 | Kulkarni et al. |
| 2010/0037088 | A1 | 2/2010 | Krivopaltsev et al. |
| 2011/0158090 | A1 | 6/2011 | Riley et al. |
| 2011/0213829 | A1 | 9/2011 | Concini et al. |
| 2011/0258638 | A1 | 10/2011 | Davies et al. |
| 2012/0210158 | A1 | 8/2012 | Akiyama |
| 2013/0060933 | A1 | 3/2013 | Tung |
| 2014/0122578 | A1 | 5/2014 | Lee |
| 2019/0334764 | A1 * | 10/2019 | Chor .............. H04L 41/0686 |

FOREIGN PATENT DOCUMENTS

| | | |
|---|---|---|
| CN | 103500094 A | 1/2014 |
| JP | 2011530860 | 12/2011 |
| WO | 2010016849 | 2/2010 |
| WO | 2012006638 A1 | 1/2021 |

OTHER PUBLICATIONS

Office Action from Canadian Application No. 2,965,520, dated Feb. 22, 2021, pp. 1-8.
Extended European Search Report in Application No. 19182705.4-1213, dated Feb. 12, 2019, pp. 1-9.
Examination Report No. 2 dated Oct. 26, 2021 in Australian Patent Application No. 2020223693, Amazon Technologies, Inc. (pp. 1-4).
Notice of Allowance dated Jan. 28, 2023 in Chinese Patent Application No. 202011558103.1, Amazon Technologies, Inc., pp. 1—(including translation).
"How to Use IFTTT to Automate your Online Life", Brad Chacos, Jul. 18, 2013, pp. 1-11.
U.S. Appl. No. 14/529,096, filed Oct. 30, 2014, Mihir Rajendrabhai Patel.
Office Action from Japanese Patent Application No. 2017-522498, dated Jan. 22, 2019, pp. 1-3.
Yutaka Kudo, et al., "A Policy Description and its Execution Scheduling for Automated IT Systems Management", The transactions of the Institute of Electrical Engineers of Japan.C., Oct. 1, 2011, vol. 131, No. 10, pp. 1803-1810.
Office Action from Canadian Application No. 2965520, (Amazon Technologies Inc.), dated Feb. 4, 2019, pp. 1-4.
Invitation to Pay Additional Fees from European Application PCT/US2015/058432, Date of mailing Jan. 29, 2016, Amazon Technologies, Inc., pp. 1-5.
International Search Report and Written Opinion from PCT/US2015/058432, dated Apr. 6, 2016, Amazon Technologies, Inc., pp. 1-21.
Office Action from Japanese Application No. 2017522498, dated Apr. 10, 2018, Japanese version and English translation, pp. 1-10.
Office Action from Korean Application No. 10-2017-7014234, (Elgish Translation, Korean Version), pp. 1-11.
Office Action from Chinese Application No. 201580058832.1, (Chinese Version and English Translation), dated Sep. 27, 2019, pp. 1-25.

* cited by examiner

RULE-BASED ACTION TRIGGERING IN A PROVIDER NETWORK

This application is a continuation of U.S. patent application Ser. No. 14/529,097, filed Oct. 30, 2014, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers.

As the scale and scope of distributed systems have increased, the tasks of provisioning, administering, and managing the resources have become increasingly complicated. For example, maintenance is often necessary when problems arise with various components of distributed systems. System administrators have often performed such maintenance tasks in a manual and ad hoc manner. When maintenance tasks are performed manually, the results may be unnecessarily expensive and prone to error. Additionally, system administrators may be required to develop and deploy custom systems for performing maintenance tasks.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for rule-based action triggering in a provider network are described.

Using the techniques described herein, rules may be defined based on triggers and actions. In one embodiment, a rule may include one or more triggers and one or more actions. Resources in a provider network may be monitored during their operation. When the conditions for any of the triggers are met, any actions associated with the triggers in the rules may be performed. To initiate the actions, messages describing the actions may be generated and sent to a messaging service. For example, the messaging service may include a queue service, and the messages may be placed in one or more queues. The messages may be delivered from the messaging service to one or more action handlers that carry out the actions described in the messages. In this manner, maintenance tasks or other tasks in a provider network may be automated.

Various embodiments of methods and systems for a routing handler for rule-based action triggering are described. Using the techniques described herein, a routing handler may route requests to various sub-services. The routing handler may use a routing map retrieved from an external data store to map particular operations in requests to particular sub-services. The sub-services may include sub-services for rule-based action triggering, scheduling actions, performing actions based on the rules, and/or any other suitable tasks. When one or more operations at a particular sub-service are updated, the routing map may be updated instead of the routing handler itself. The routing handler may be part of a fleet of routing handlers. By updating the routing map instead of the entire fleet of routing handlers, updates to sub-services may be implemented efficiently.

Rule-Based Action Triggering in a Provider Network

Figure 1:
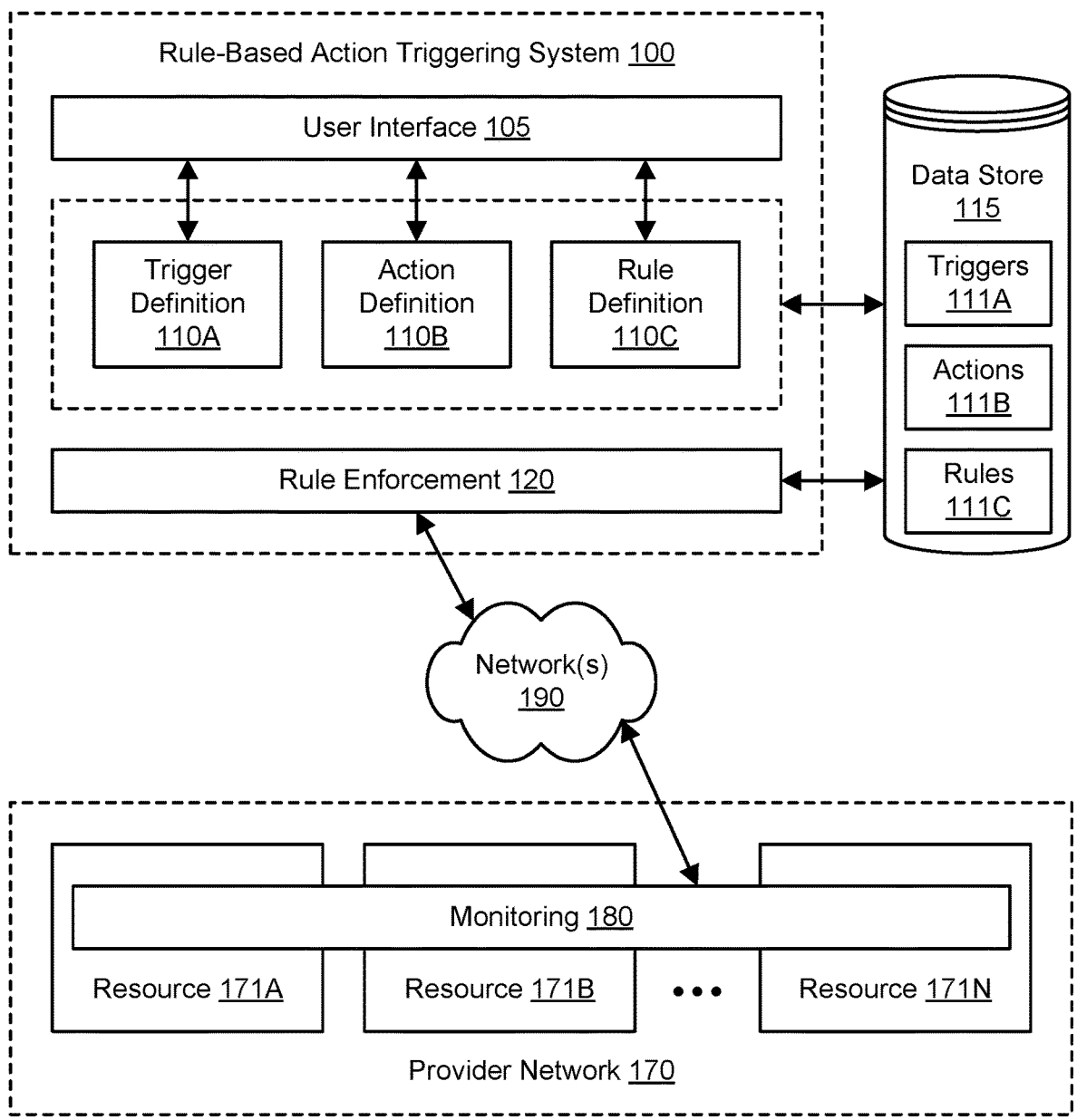
FIG. 1 illustrates an example system environment for rule-based action triggering in a provider network, according to some embodiments.

FIG. 1 illustrates an example system environment for rule-based action triggering in a provider network, according to some embodiments. A rule-based action triggering system 100 may include a plurality of components for triggering and performing actions based on rules. In one embodiment, the rule-based action triggering system 100 may include a trigger definition functionality 110A, an action definition functionality 110B, and a rule definition functionality 110C. A data store 115 may store information associated with the triggers 111A, actions 111B, and rules 111C defined using the trigger definition functionality 110A, action definition functionality 110B, and/or rule definition functionality 110C. The data store 115 may be implemented using any suitable storage technologies, such as database management technologies.

The rule-based action triggering system 100 may also include a user interface 105. In one embodiment, the user interface 105 may enable a user to define and/or select triggers 111A, actions 111B, and/or rules 111C using the trigger definition functionality 110A, action definition functionality 110B, and/or rule definition functionality 110C. For example, the user interface 105 may permit a user to select one or more predefined triggers and/or define one or more custom triggers. Similarly, the user interface 105 may permit a user to select one or more predefined actions and/or define one or more custom actions. The user interface 105 may permit a user to define one or more rules. In one embodiment, a rule may be defined to include one or more triggers and one or more actions. In one embodiment, a rule may be defined to include a trigger and a message exchange. Definitions of triggers 111A, actions 111B, and rules 111C are discussed in greater detail below with respect to FIGS. 4A, 4B, 4C, 4D, 5A, and 5B.

Figure 16:
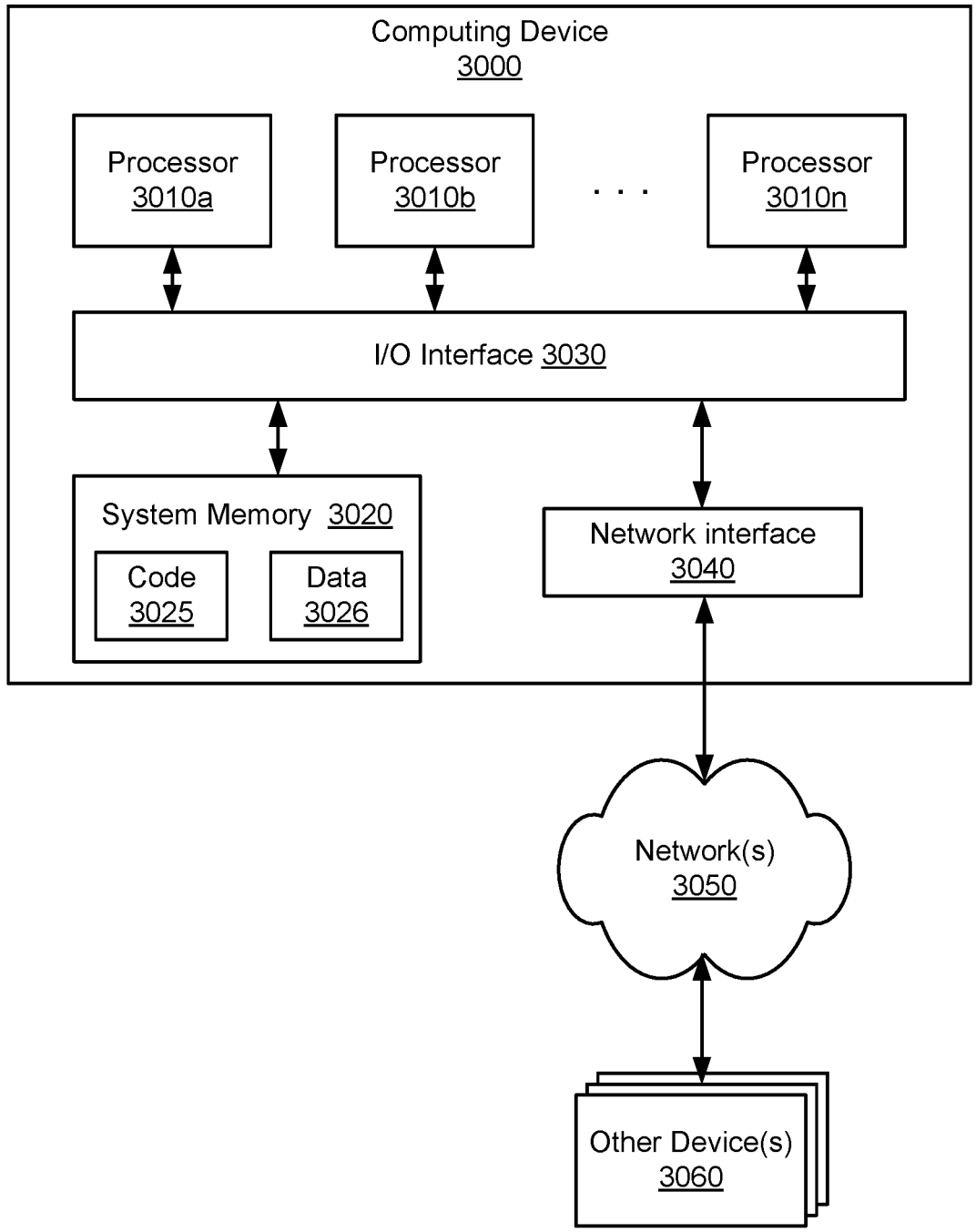
FIG. 16 illustrates an example of a computing device that may be used in some embodiments.

The rule-based action triggering system 100 may be implemented using one or more computing devices, any of which may be implemented by the example computing device 3000 illustrated in FIG. 16. In various embodiments, portions of the functionality of the rule-based action triggering system 100 may be provided by the same computing device or by any suitable number of different computing devices. If any of the components of the rule-based action triggering system 100 are implemented using different computing devices, then the components and their respective computing devices may be communicatively coupled, e.g., via a network. Each of the illustrated components may represent any combination of software and hardware usable to perform their respective functions. It is contemplated that the rule-based action triggering system 100 may include additional components not shown, fewer components than shown, or different combinations, configurations, or quantities of the components shown.

The rule-based action triggering system 100 may be coupled to a provider network 170 using one or more networks 190 or other interconnects. The provider network 170 may include a plurality of computing resources such as computing resources 171A and 171B through 171N. The resources 171A-171N may include any suitable number and configuration of compute instances and/or other processing resources, storage resources, database resources, network resources, power resources, and/or other suitable types of computing resources. Although three computing resources 171A, 171B, and 171N are shown for purposes of illustration, it is contemplated that any suitable number and configuration of computing resources may be used. The provider network 170 may include the sources of triggers for actions, the targets of triggered actions, and/or one or more action handlers that perform triggered actions.

The provider network 170 may be operated by an entity such as a company or a public sector organization to provide resources (such as resources 171A-171N) and/or services (such as various types of cloud-based computing or storage) to a distributed set of clients via the Internet and/or other networks. The provider network 170 may include numerous data centers hosting various resource pools, such as collections of physical and/or virtualized computer servers, storage devices, and networking equipment that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network 170 in different embodiments, including general purpose or special purpose computer servers, storage devices, network devices, and the like.

In one embodiment, the provider network 170 may implement a flexible set of resource reservation, control, and access interfaces for clients. For example, the provider network 170 may implement a programmatic resource reservation interface (e.g., via a web site or a set of web pages) that allows clients to learn about, select, purchase access to, and/or reserve resources. In one embodiment, resources may be reserved on behalf of clients using a client-accessible service. In one embodiment, the provider network 170 may execute tasks on behalf of clients using one or more resources of a selected resource pool of the provider network. In one embodiment, the resource pool may be automatically selected based on the anticipated computational needs of the various tasks. In one embodiment, the resource pool may be selected based on a specific resource request or reservation submitted by the client.

The provider network 170 may also include a monitoring functionality 180. The monitoring functionality 180 may monitor any of the resources, e.g., during operation and/or use of the resources. The monitoring functionality 180 may use agent software or any other suitable techniques to monitor individual resources. In one embodiment, monitoring the resources in the provider network may include monitoring one or more service logs, monitoring one or more service metrics, and/or monitoring any suitable data streams. In one embodiment, the monitoring may compare performance metrics, usage metrics, and/or other suitable data relating to the operation of the resources 171A-171N to predetermined thresholds and/or alarms. Any suitable predetermined thresholds and/or alarms may represent one or more conditions for a particular trigger. When the monitoring of the computing resources indicates that any conditions for a trigger are met, the monitoring functionality 180 may fire or activate the trigger. The monitoring functionality 180 may determine that conditions have been met for a trigger based on thresholds and/or alarms. For example, the monitoring functionality 180 may detect an alarm state change and may cause a trigger to be fired as a result. In one embodiment, external agents may implement the monitoring functionality 180 and fire triggers. In one embodiment, services within the provider network 170 may implement the monitoring functionality 180 and fire triggers. In one embodiment, the monitoring functionality 180 may fire a trigger by sending a request to the rule-based action triggering system 100 through an appropriate application programming interface (API).

In one embodiment, the rule-based action triggering system 100 may include a rule enforcement functionality 120. The rule enforcement functionality 120 may act upon fired triggers, e.g., after receiving requests to fire triggers. When a request to fire a trigger is received, the rule enforcement functionality 120 may determine which rules, if any, include the trigger. To determine which rules include the trigger, the rule enforcement functionality 120 may refer to the stored rules, triggers, and/or other appropriate data in the data store 115. After retrieving any rules that include the fired trigger, the rule enforcement functionality 120 may determine any actions defined in the retrieved rules. The rule enforcement functionality 120 may then initiate any actions defined in the retrieved rules or otherwise cause the actions to be performed. When initiating actions, the rule enforcement functionality 120 may supply metadata or parameters for the actions, e.g., as received in requests to fire triggers. In this manner, the rule-based action triggering system 100 may use defined rules to perform particular actions when particular triggers are activated.

Figure 2:
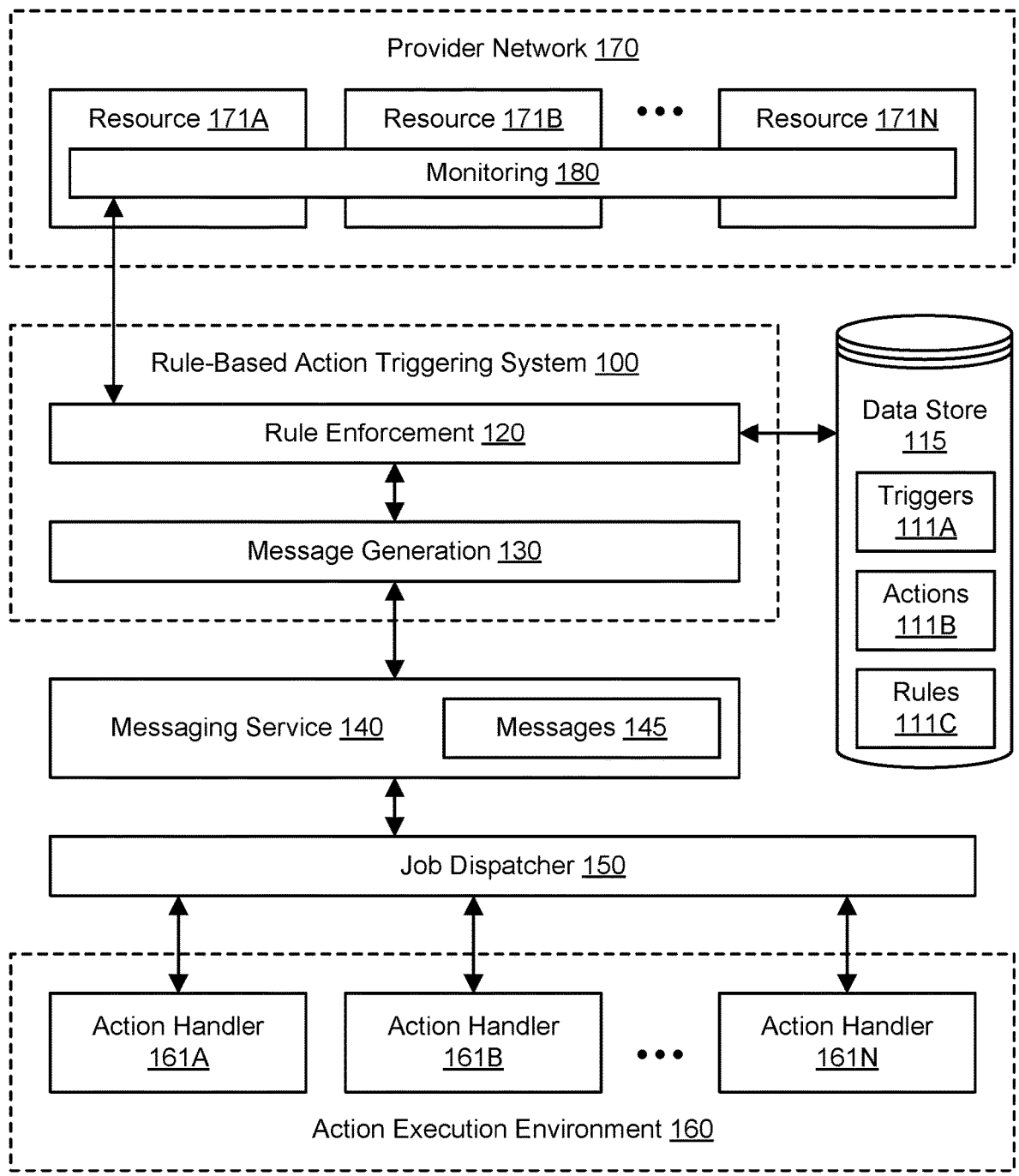
FIG. 2 illustrates further aspects of the example system environment for rule-based action triggering in a provider network, according to some embodiments.

FIG. 2 illustrates further aspects of the example system environment for rule-based action triggering in a provider network, according to some embodiments. The rule-based action triggering system 100 may include a message generation functionality 130. When invoked by the rule enforcement functionality 120, the message generation functionality 130 may generate messages 145 that describe actions to be performed, e.g., when triggers associated with the actions are fired. The message generation functionality 130 may send the messages 145 to a messaging service 140. The messages may be generated based on run-time input parameters supplied with any fired triggers and/or default parameters associated with actions. In one embodiment, a job dispatcher 150 may interact with the messaging service 140 to dispatch jobs based on the messages 145.

In one embodiment, an action execution environment 160 may perform the actions described in the messages 145 and dispatched by the job dispatcher 150. The action execution environment 160 may include one or more environments for executing instructions, including scripts, workflows, and/or compiled program code. The action execution environment 160 may include one or more action handlers, such as action handlers 161A and 161B through 161N. Although three action handlers 161A, 161B, and 161N are shown for purposes of illustration, it is contemplated that any suitable number of action handlers may be used. The actions performed by the action handlers 161A-161N may include any suitable modification and/or configuration of any of the resources 171A-171N and/or their constituent elements. For example, the actions may automatically terminate, suspend, or restart a compute instance in the provider network 170 when a particular trigger is fired. As another example, an action may be performed to automatically resize an image file to a predefined width and predefined height when the image file is added to a particular storage location, directory, or bucket. An action may be performed by an action handler based on a trigger being fired, based on a schedule, or based on a request from a user or other computing component.

In one embodiment, the rule-based action triggering system 100 may include a recommendation engine. The recommendation engine may use machine learning techniques to recommend automations to the customers based on customer resource usage patterns and/or resource metadata. The recommendation engine may also adapt to customer reaction and improve the recommendations over time. The recommendations may be improved using a feedback loop with input from customers and popular trends in the rule-based action triggering system 100.

Figure 3:
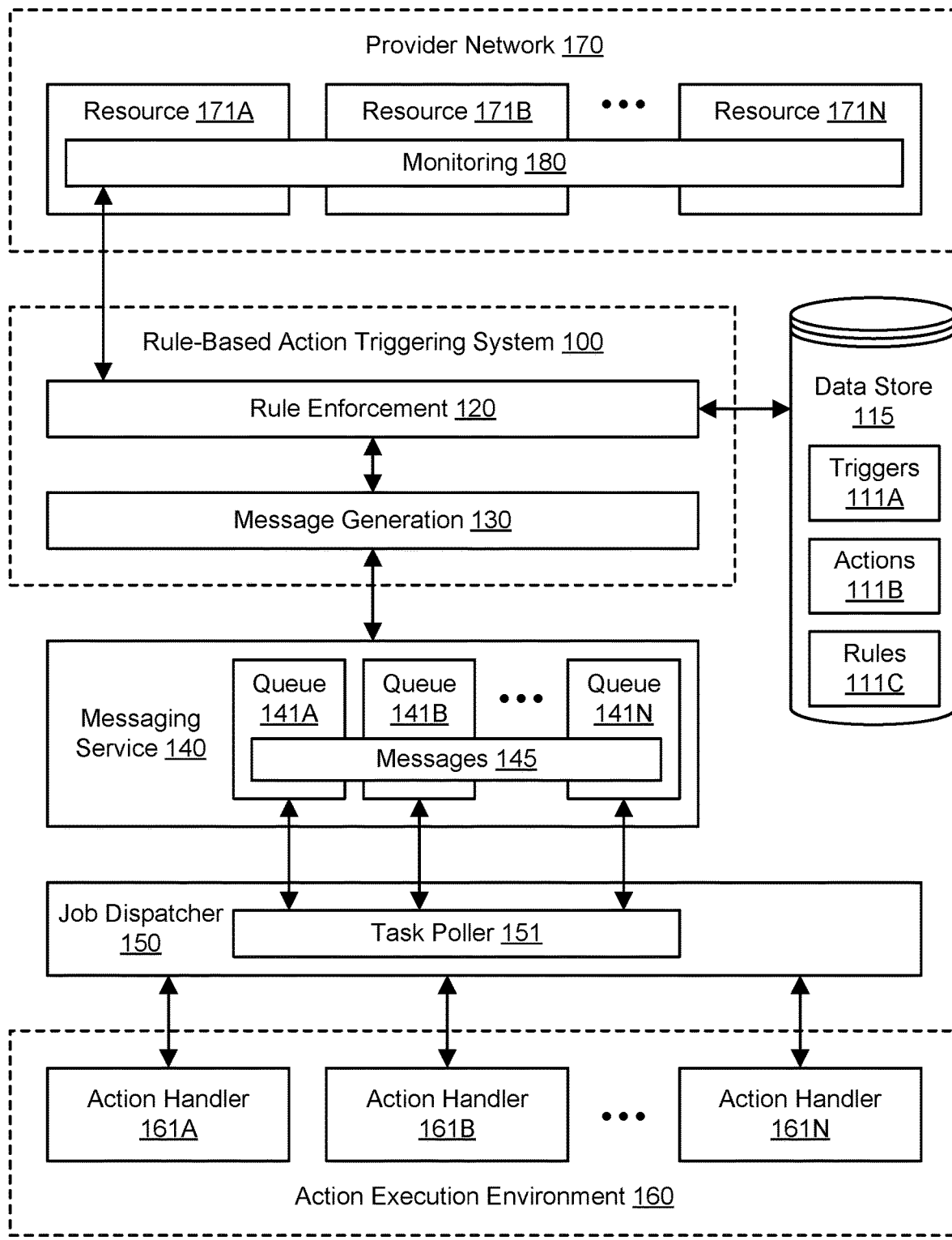
FIG. 3 illustrates further aspects of the example system environment for rule-based action triggering in a provider network, including a queue service, according to some embodiments.

FIG. 3 illustrates further aspects of the example system environment for rule-based action triggering in a provider network, including a queue service, according to some embodiments. In one embodiment, the messaging service 140 may be implemented using a queue service that manages one or more queues. Messages 145 describing actions to be performed may be sent to the messaging service or placed in the one or more queues. Although three queues 141A, 141B, and 141N are shown for purposes of illustration, it is contemplated that any suitable number of queues may be used. In one embodiment, the queue 141A may be a primary queue that initially stores all the messages generated by the message generation functionality 130, and the other queues 141B-141N may only be used as backup queues if the primary queue is insufficient to handle all the messages.

In one embodiment, the job dispatcher 150 may be implemented using a task poller 151. The task poller 151 may poll the one or more queues at a suitable interval to determine whether the queues include messages, e.g., messages describing actions to be performed. The task poller 151 may initiate the use of the backup queues 141B-141N upon receiving an appropriate error message from the primary queue 141A. The task poller 151 may poll each of the various queues 141A-141N at particular intervals. In one embodiment, the task poller 151 may poll the primary queue 141A more frequently than the backup queues 141B-141N.

Figure 4A:
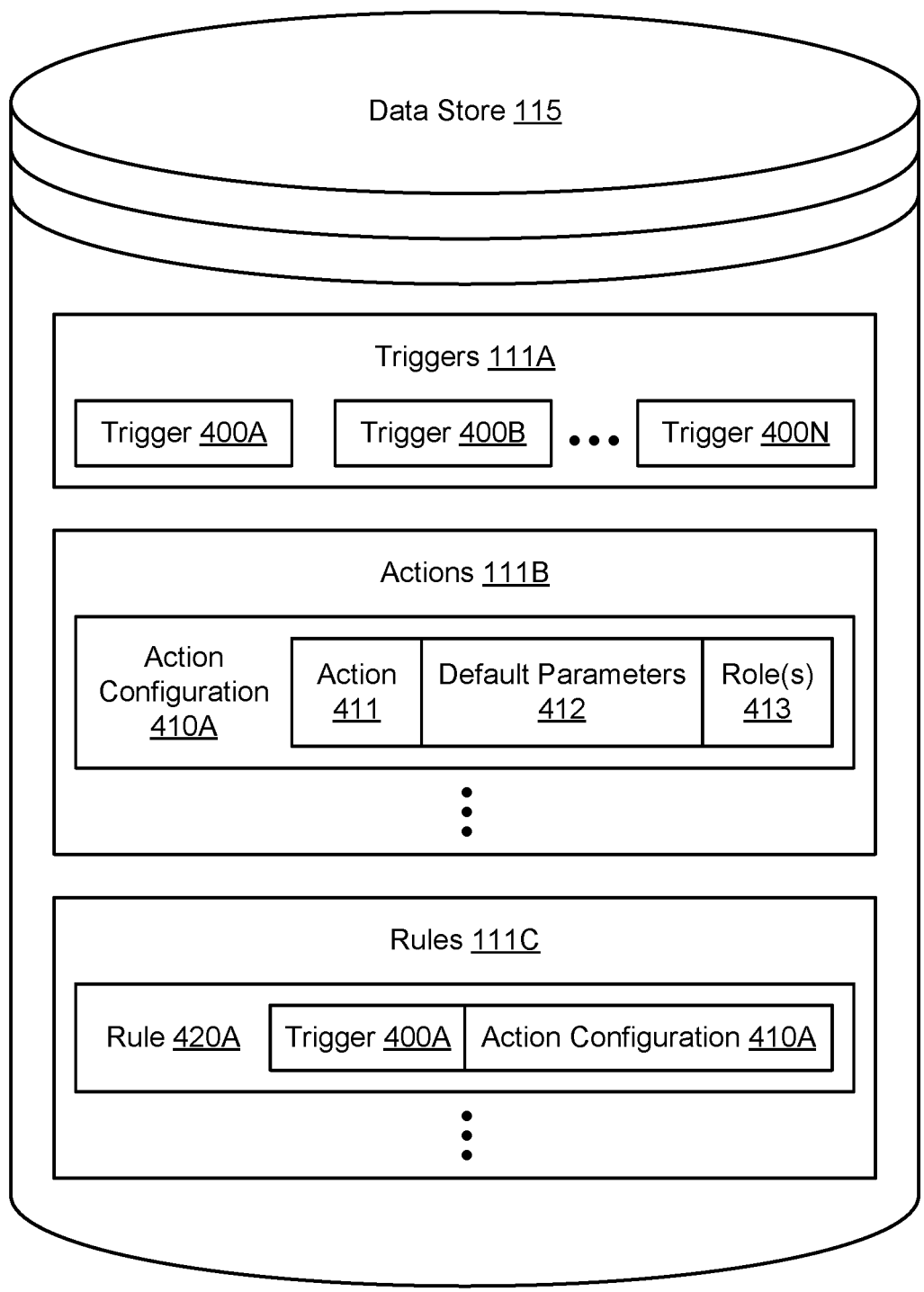
FIG. 4A illustrates further aspects of the example system environment for rule-based action triggering in a provider network, including a one-to-one mapping of triggers to actions, according to some embodiments.

FIG. 4A illustrates further aspects of the example system environment for rule-based action triggering in a provider network, including a one-to-one mapping of triggers to actions, according to some embodiments. As discussed above, the data store 115 may store triggers 111A, actions 111B, and rules 111C. In the example shown in FIG. 4A, the triggers 111A may include triggers 400A and 400B through 400N. However, it is contemplated that any suitable number of triggers may be stored in the data store 115.

In the example shown in FIG. 4A, the actions 111B may include an action configuration 410A and one or more additional action configurations (not shown). Each action configuration (such as action configuration 410A) may include an action (such as action 411), any default parameters for the action (such as default parameters 412), and any roles (such as role(s) 413) needed for the action. An action may include one or more commands, instructions, or other invocations of functionality to perform one or more tasks. An action may be associated with default parameters that apply to all invocations of the action. In one embodiment, run-time input parameters may also be specified for a particular instance of an action when the action is invoked. In one embodiment, the run-time input parameters may augment but not override the default parameters. For example, if an action involves resizing an image file when the image file is added, then the default parameters may include a target width and height, and the run-time input parameters may include the storage location of the image file. A role may include permissions or other security credentials that permit the action to have access to a set of resources at run-time. A role may be independent of any particular user or group of users and may represent a delegation of authority to the associated action.

In the example shown in FIG. 4A, the rules 111C may include a rule 420A and one or more additional rules (not shown). The rule 420A may specify one of the triggers, such as trigger 400A, and one of the action configurations, such as action configuration 410A. When the trigger 400A is fired, the rule enforcement functionality 120 may use the data store 115 to determine that the trigger 400A is part of rule 420A. The rule enforcement functionality 120 may also use the data store 115 to determine that the action configuration 410A is also part of the rule 420A, i.e., is bound to the trigger 400A. The rule enforcement functionality 120 may then cause the specified action 411 to be performed with the default parameters 412 (and optionally run-time input parameters) and using the role(s) 413. In one embodiment, the message generation functionality 130 may generate a message specifying the action 411, the default parameters 412, any run-time input parameters, and the role(s) 413.

Figure 4B:
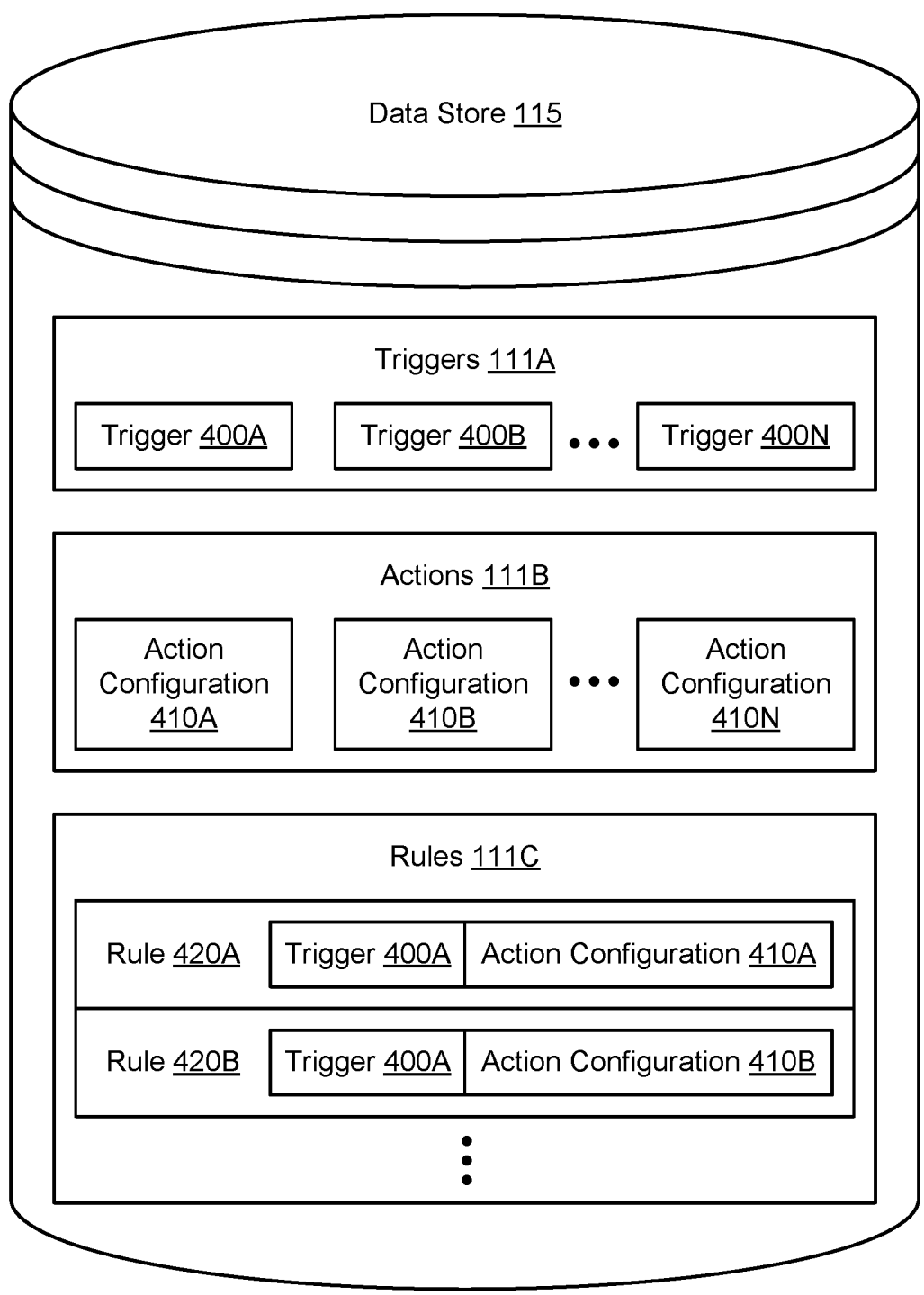
FIG. 4B illustrates further aspects of the example system environment for rule-based action triggering in a provider network, including a one-to-many mapping of triggers to actions, according to some embodiments.

FIG. 4B illustrates further aspects of the example system environment for rule-based action triggering in a provider network, including a one-to-many mapping of triggers to actions, according to some embodiments. In the example shown in FIG. 4B, the triggers 111A may include triggers 400A and 400B through 400N. However, it is contemplated that any suitable number of triggers may be stored in the data store 115. In the example shown in FIG. 4B, the actions 111B may include action configurations 410A and 410B through 410N. However, it is contemplated that any suitable number of action configurations may be stored in the data store 115. As discussed above, each of the action configurations 410A-410N may include an action, any default parameters for the action, and any roles needed for the action. Individual ones of the action configurations 410A-410N may represent the same actions (e.g., with different default parameters) or different actions.

In one embodiment, the rules 111C may include a one-to-many mapping of triggers to actions. In the example shown in FIG. 4B, the rules 111C may include rules 420A and 420B. Rule 420A may represent a binding of trigger 400A to action configuration 410A. Rule 420B may represent a binding of the same trigger 400A to a different action configuration 410B. When the trigger 400A is fired, the rule enforcement functionality 120 may use the data store 115 to determine that the trigger 400A is part of rules 420A and 420B. The rule enforcement functionality 120 may also use the data store 115 to determine that the action configuration 410A is part of the rule 420A and that the action configuration 410B is part of the rule 420B. The rule enforcement functionality 120 may then cause the actions specified in both action configurations 410A and 410B to be performed. In one embodiment, the message generation functionality 130 may generate one or more messages specifying the actions, the default parameters associated with the actions, any run-time input parameters, and any necessary role(s).

Figure 4C:
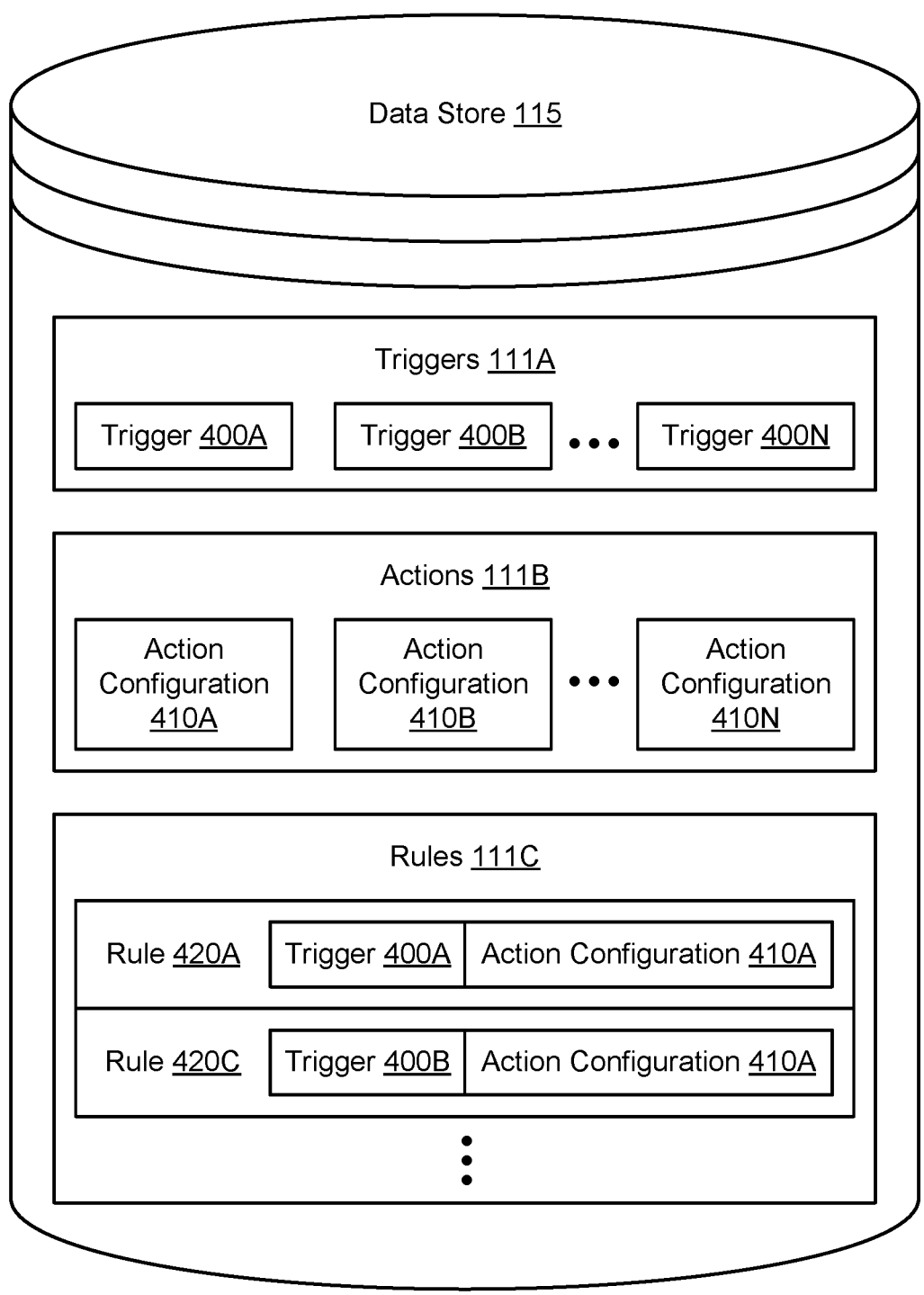
FIG. 4C illustrates further aspects of the example system environment for rule-based action triggering in a provider network, including a many-to-one mapping of triggers to actions, according to some embodiments.

FIG. 4C illustrates further aspects of the example system environment for rule-based action triggering in a provider network, including a many-to-one mapping of triggers to actions, according to some embodiments. In the example shown in FIG. 4C, the triggers 111A may include triggers 400A and 400B through 400N. However, it is contemplated that any suitable number of triggers may be stored in the data store 115. In the example shown in FIG. 4C, the actions 111B may action configurations 410A and 410B through 410N. However, it is contemplated that any suitable number of action configurations may be stored in the data store 115. As discussed above, each of the action configurations 410A-410N may include an action, any default parameters for the action, and any roles needed for the action.

In one embodiment, the rules 111C may include a many-to-one mapping of triggers to actions. In the example shown in FIG. 4C, the rules 111C may include rules 420A and 420C. Rule 420A may represent a binding of trigger 400A to action configuration 410A. Rule 420C may represent a binding of a different trigger 400B to the same action configuration 410A. When the trigger 400A is fired, the rule enforcement functionality 120 may use the data store 115 to determine that the trigger 400A is part of rule 420A. Similarly, when the trigger 400B is fired, the rule enforcement functionality 120 may use the data store 115 to determine that the trigger 400B is part of rule 420C. When either or both triggers 400A and/or 400B are fired, the rule enforcement functionality 120 may use the data store 115 to determine that the action configuration 410A is part of the rule 420A and that the action configuration 410A is also part of the rule 420C. If either of the triggers 400A or 400B has been fired, or both have been fired, then the rule enforcement functionality 120 may then cause the action specified in the action configuration 410A to be performed. In one embodiment, the message generation functionality 130 may generate a message specifying the action, the default parameters associated with the action, any run-time input parameters, and any necessary role(s).

Figure 4D:
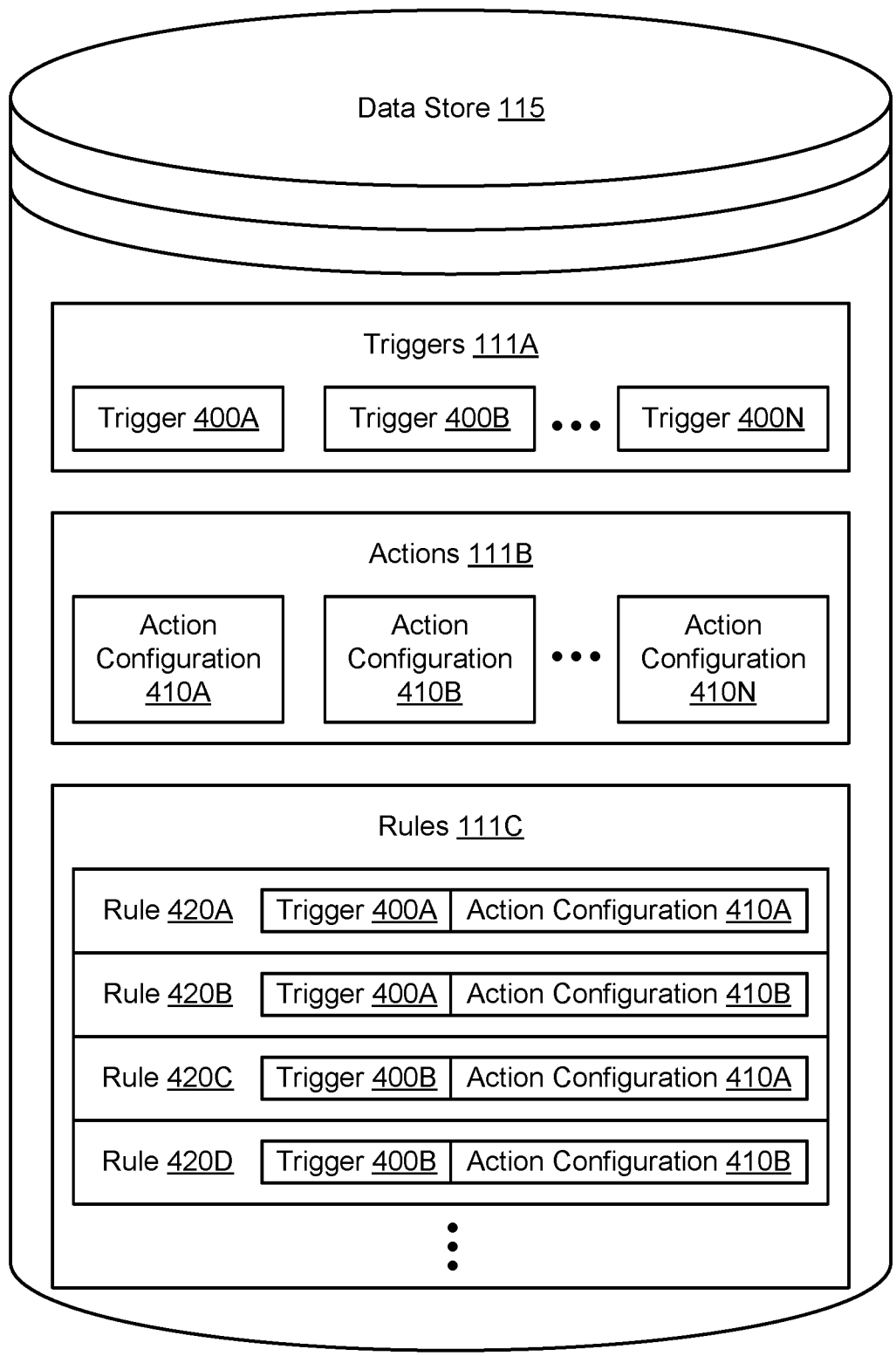
FIG. 4D illustrates further aspects of the example system environment for rule-based action triggering in a provider network, including a many-to-many mapping of triggers to actions, according to some embodiments.

FIG. 4D illustrates further aspects of the example system environment for rule-based action triggering in a provider network, including a many-to-many mapping of triggers to actions, according to some embodiments. In the example shown in FIG. 4D, the triggers 111A may include triggers 400A and 400B through 400N. However, it is contemplated that any suitable number of triggers may be stored in the data store 115. In the example shown in FIG. 4D, the actions 111B may action configurations 410A and 410B through 410N. However, it is contemplated that any suitable number of action configurations may be stored in the data store 115. As discussed above, each of the action configurations 410A-410N may include an action, any default parameters for the action, and any roles needed for the action.

In one embodiment, the rules 111C may include a many-to-many mapping of triggers to actions. In the example shown in FIG. 4D, the rules 111C may include rules 420A, 420B, 420C, and 420D. Rule 420A may represent a binding of a first trigger 400A to a first action configuration 410A. Rule 420B may represent a binding of the first trigger 400A to a second action configuration 410B. Rule 420C may represent a binding of a second trigger 400B to the first action configuration 410A. Rule 420D may represent a binding of the second trigger 400B to the second action configuration 410B. When the trigger 400A is fired, the rule enforcement functionality 120 may use the data store 115 to determine that the trigger 400A is part of rules 420A and 420B. The rule enforcement functionality 120 may also use the data store 115 to determine that the action configuration 410A is part of the rule 420A and that the action configuration 410B is part of the rule 420B. Similarly, when the trigger 400B is fired, the rule enforcement functionality 120 may use the data store 115 to determine that the trigger 400B is part of rules 420C and 420D. The rule enforcement functionality 120 may also use the data store 115 to determine that the action configuration 410A is part of the rule 420C and that the action configuration 410B is part of the rule 420D. If either of the triggers 400A or 400B has been fired, or both have been fired, then the rule enforcement functionality 120 may then cause the actions specified in the action configurations 410A and 410B to be performed. In one embodiment, the message generation functionality 130 may generate one or more messages specifying the actions, the default parameters associated with the actions, any run-time input parameters, and any necessary role(s).

Figure 5A:
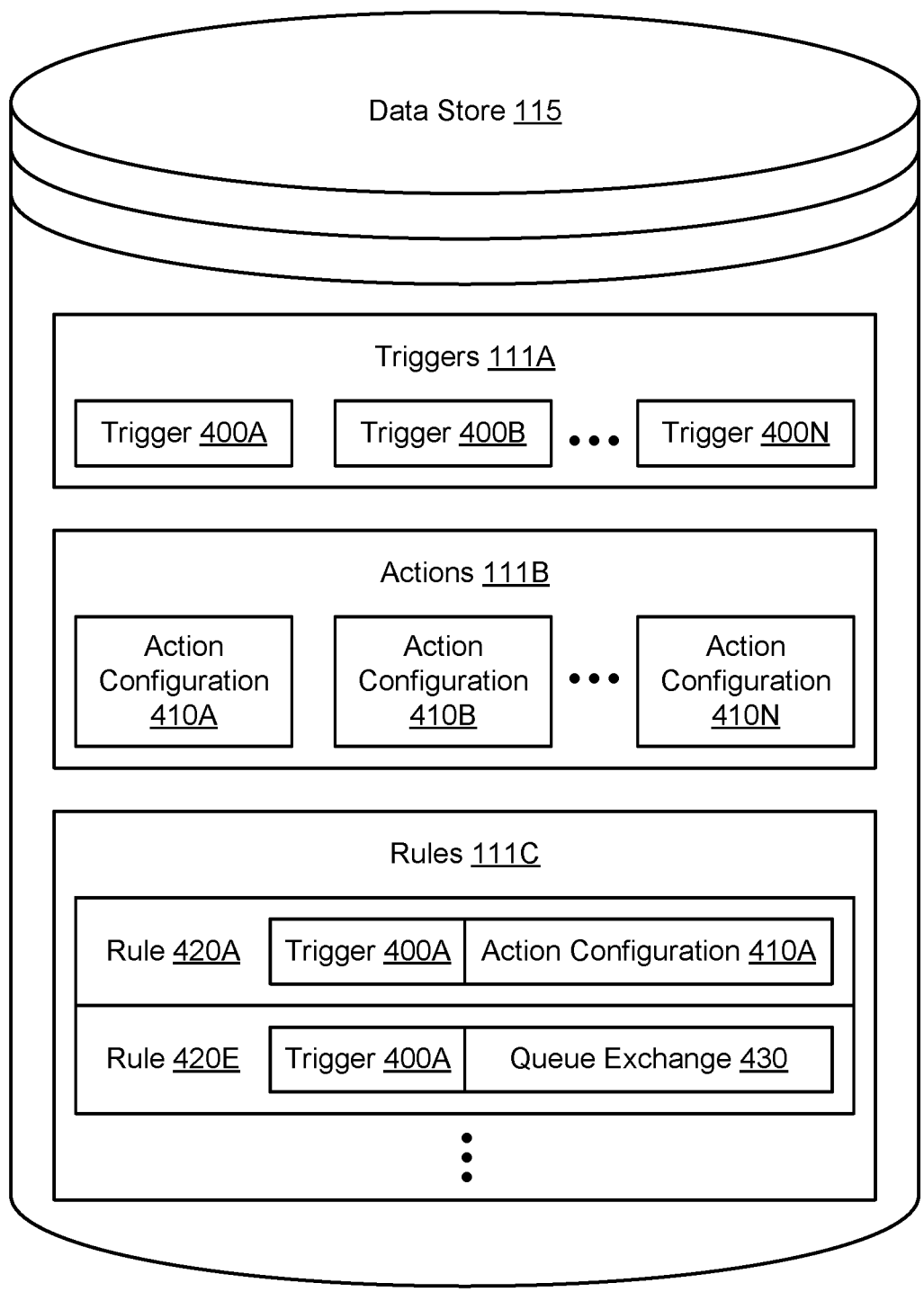
FIG. 5A illustrates further aspects of the example system environment for rule-based action triggering in a provider network, including a mapping of a trigger to an action and also to a queue exchange, according to some embodiments.

FIG. 5A illustrates further aspects of the example system environment for rule-based action triggering in a provider network, including a mapping of a trigger to an action and also to a queue exchange, according to some embodiments. In the example shown in FIG. 5A, the triggers 111A may include triggers 400A and 400B through 400N. However, it is contemplated that any suitable number of triggers may be stored in the data store 115. In the example shown in FIG. 5A, the actions 111B may action configurations 410A and 410B through 410N. However, it is contemplated that any suitable number of action configurations may be stored in the data store 115. As discussed above, each of the action configurations 410A-410N may include an action, any default parameters for the action, and any roles needed for the action.

In one embodiment, the rules 111C may include a mapping of triggers to actions and also a mapping of triggers to queue exchanges. In the example shown in FIG. 5A, the rules 111C may include rules 420A and 420E. Rule 420A may represent a binding of trigger 400A to action configuration 410A. Rule 420E may represent a binding of the same trigger 400A to a queue exchange 430. The queue exchange 430 may specify one or more queue messages to be generated. When the trigger 400A is fired, the rule enforcement functionality 120 may use the data store 115 to determine that the trigger 400A is part of rules 420A and 420E. The rule enforcement functionality 120 may also use the data store 115 to determine that the action configuration 410A is part of the rule 420A and that the queue exchange 430 is part of the rule 420B. The rule enforcement functionality 120 may then cause the action specified in the action configuration 410A to be performed. In one embodiment, the message generation functionality 130 may generate one or more messages specifying the actions, the default parameters associated with the actions, any run-time input parameters, and any necessary role(s). Additionally, the rule enforcement functionality 120 may generate a queue message as specified by the queue exchange 430 and place that message in a queue or otherwise send the message to a messaging service. For example, the queue message may represent a notification (e.g., to an administrator or log) that the trigger 400A was fired at a particular time or that the action in the action configuration 410A was performed with particular parameters and at a particular time.

Figure 5B:
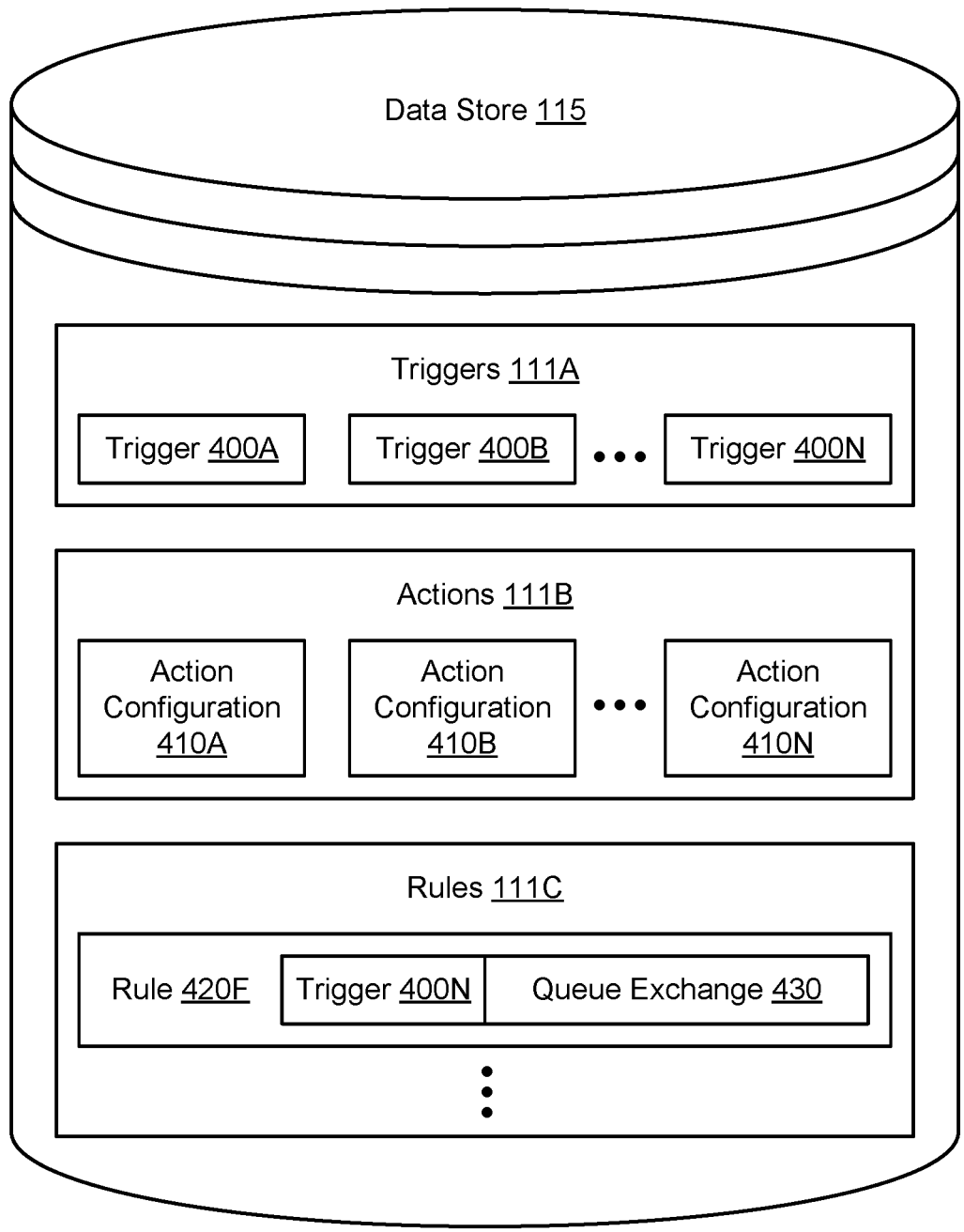
FIG. 5B illustrates further aspects of the example system environment for rule-based action triggering in a provider network, including a mapping of a trigger to a queue exchange and not to an action, according to some embodiments.

FIG. 5B illustrates further aspects of the example system environment for rule-based action triggering in a provider network, including a mapping of a trigger to a queue exchange and not to an action, according to some embodiments. In the example shown in FIG. 5B, the triggers 111A may include triggers 400A and 400B through 400N. However, it is contemplated that any suitable number of triggers may be stored in the data store 115. In the example shown in FIG. 5B, the actions 111B may action configurations 410A and 410B through 410N. However, it is contemplated that any suitable number of action configurations may be stored in the data store 115. As discussed above, each of the action configurations 410A-410N may include an action, any default parameters for the action, and any roles needed for the action.

In one embodiment, the rules 111C may include a mapping of triggers to queue exchanges. In the example shown in FIG. 5B, the rules 111C may include a rule 420F. Rule 420F may represent a binding of trigger 400N to a queue exchange 430. The queue exchange 430 may specify one or more queue messages to be generated. The same trigger 400N may not be bound to any of the action configurations 410A-410N. When the trigger 400N is fired, the rule enforcement functionality 120 may use the data store 115 to determine that the trigger 400N is part of rule 420F. The rule enforcement functionality 120 may also use the data store 115 to determine that the queue exchange 430 is part of the rule 420F. The rule enforcement functionality 120 may generate a queue message as specified by the queue exchange 430 and place that message in a queue or otherwise send the message to a messaging service. For example, the queue message may represent a notification (e.g., to an administrator or log) that the trigger 400N was fired at a particular time.

Figure 6:
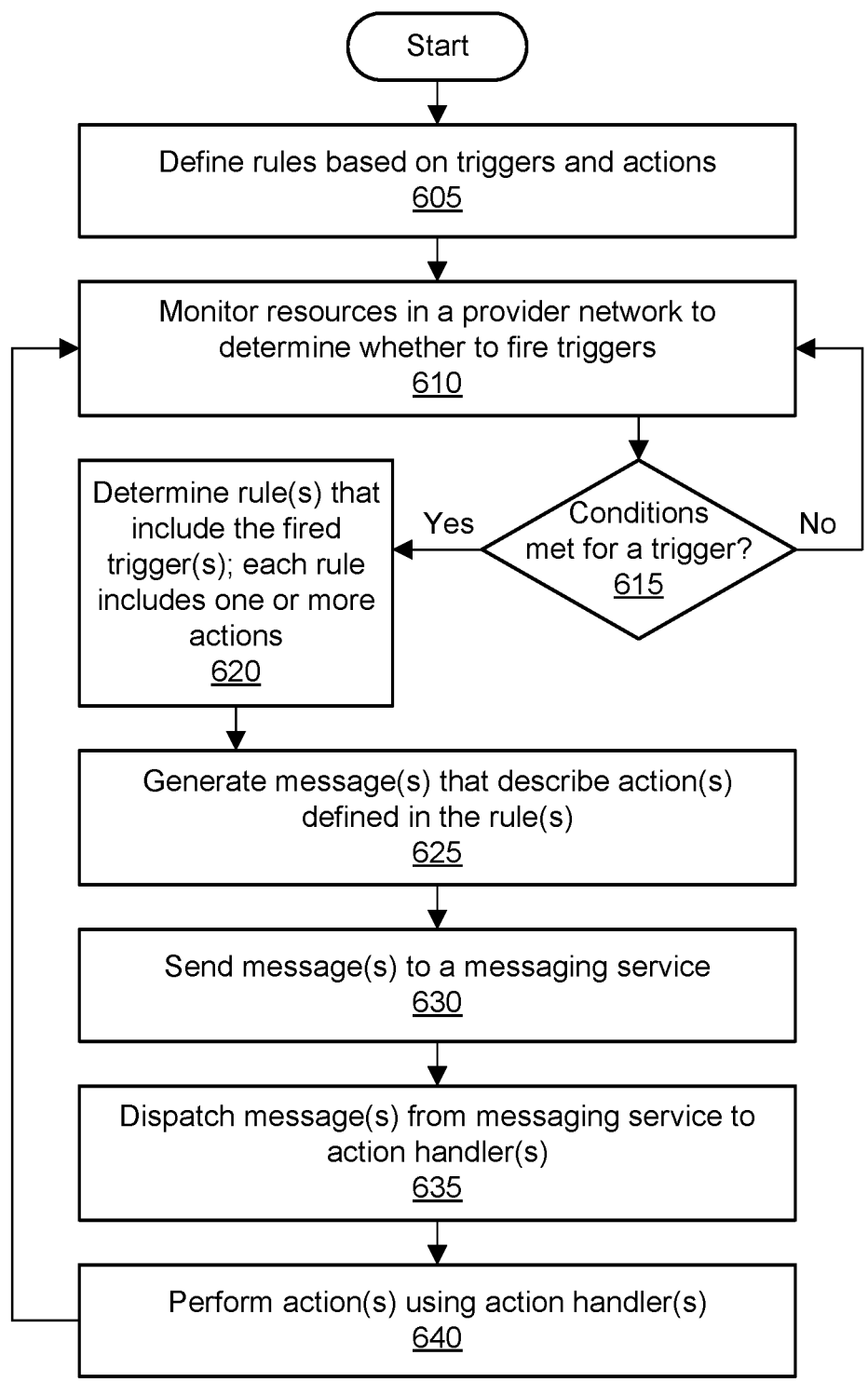
FIG. 6 is a flowchart illustrating a method for rule-based action triggering in a provider network, according to some embodiments.

FIG. 6 is a flowchart illustrating a method for rule-based action triggering in a provider network, according to some embodiments. As shown in 605, a plurality of rules may be defined based on a plurality of triggers and a plurality of actions. In one embodiment, a particular rule includes one or more of the triggers and one or more of the actions. Alternatively, a particular rule may include a trigger and a queue exchange. The triggers, actions, and/or rules may be defined or selected by a user using predefined elements and/or custom elements.

As shown in 610, a plurality of resources in the provider network may be monitored. The resources may be monitored to determine whether to fire any of the triggers. In other words, conditions in the provider network may be monitored during operation or use of the resources to determine whether the conditions satisfy any triggers. In one embodiment, monitoring the resources in the provider network may include monitoring one or more service logs, one or more service metrics, and/or one or more other data streams. The monitoring may be performed by any suitable component(s), such as external agents and/or services themselves. As shown in 615, it may be determined, based on the monitoring, that conditions have been met for a particular one or more triggers. The operation shown in 615 may include comparing metrics to thresholds, analyzing logs, and/or detecting alarm stage changes. If the conditions have been met for a trigger, then a "fire trigger" request may be sent to a rule-based action triggering system, e.g., from an external agent, service, or other entity that performs the monitoring.

As shown in 620, a particular one or more of the rules may be determined that include the particular one or more triggers that were fired. The particular one or more rules may be determined in response to determining that the conditions are met for the particular one or more triggers. The particular one or more rules may be determined by retrieving the rules from a data store based on the particular one or more triggers defined within the rules. Each of the particular rule(s) may also include a particular one or more actions.

As shown in 625, one or more messages may be generated. The one or more messages may describe the particular one or more actions in the particular one or more rules that also include the particular one or more triggers. As shown in 630, the one or more messages may be sent to a messaging service. In one embodiment, the messaging service may be implemented using a queue service, and the one or more messages may be placed in one or more queues managed by the queue service.

As shown in 635, the one or more messages may be dispatched from the messaging service to one or more action handlers. The action handler(s) may be part of an action execution environment. As shown in 640, the one or more action handlers may perform the one or more actions described in the one or more messages. In one embodiment, a performed action may result in another trigger being fired, such that the operations shown in 610 through 640 are performed again for a different trigger, different rule, and/or different action. In this manner, triggers may be chained to other triggers to perform complex chains of actions.

Figure 7:
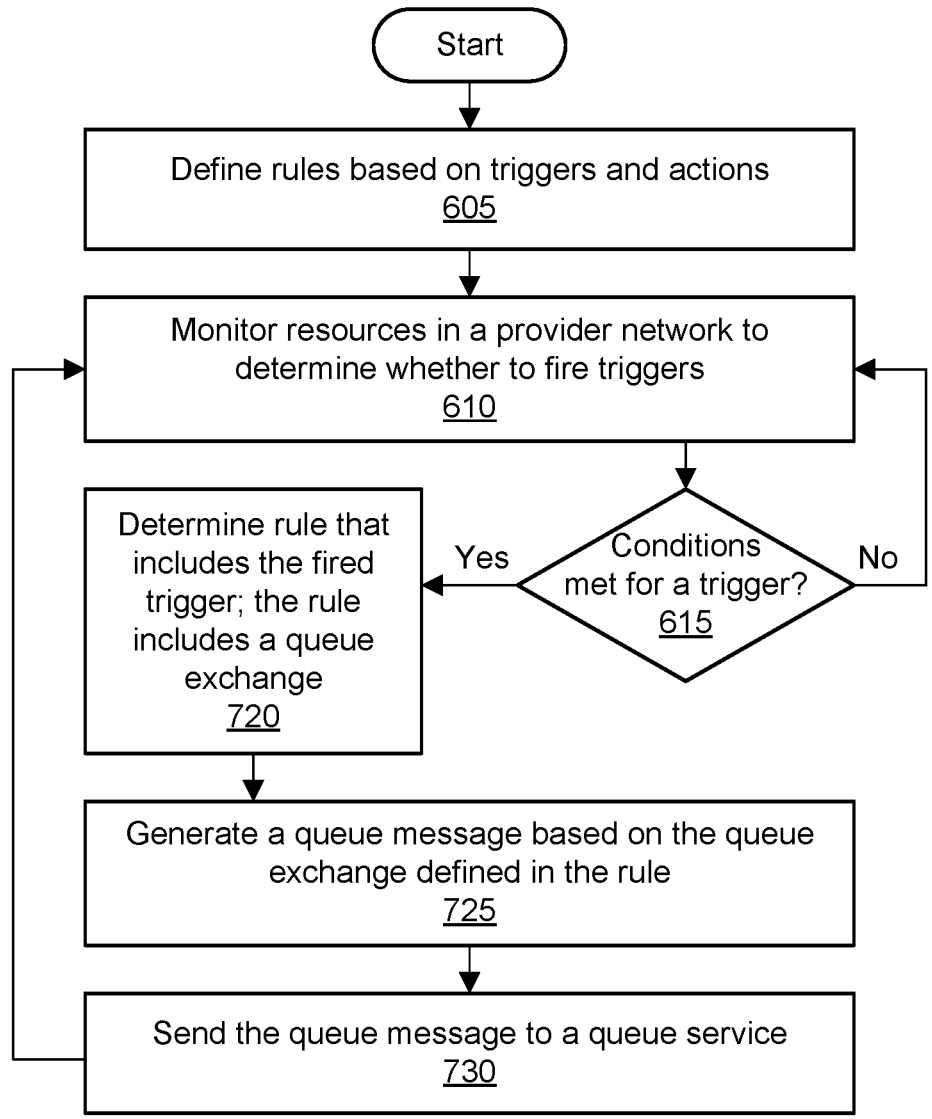
FIG. 7 is a flowchart illustrating a method for rule-based message triggering in a provider network, according to some embodiments.

FIG. 7 is a flowchart illustrating a method for rule-based message triggering in a provider network, according to some embodiments. As shown in 605, a plurality of rules may be defined based on a plurality of triggers and a plurality of actions. In one embodiment, a particular rule includes one or more of the triggers and one or more of the actions. Alternatively, a particular rule may include a trigger and a queue exchange. The triggers, actions, and/or rules may be defined or selected by a user using predefined elements and/or custom elements.

As shown in 610, a plurality of resources in the provider network may be monitored. The resources may be monitored to determine whether to fire any of the triggers. In other words, conditions in the provider network may be monitored during operation or use of the resources to determine whether the conditions satisfy any triggers. In one embodiment, monitoring the resources in the provider network may include monitoring one or more service logs, one or more service metrics, and/or one or more other data streams. The monitoring may be performed by any suitable component(s), such as external agents and/or services themselves. As shown in 615, it may be determined, based on the monitoring, that conditions have been met for a particular one or more triggers. The operation shown in 615 may include comparing metrics to thresholds, analyzing logs, and/or detecting alarm stage changes. If the conditions have been met for a trigger, then a "fire trigger" request may be sent to a rule-based action triggering system, e.g., from an external agent, service, or other entity that performs the monitoring.

As shown in 720, a particular rule may be determined that includes the particular trigger that was fired. The particular rule may be determined in response to determining that the conditions are met for the particular trigger. The particular rule may be determined by retrieving the rule from a data store based on the particular trigger defined within the rule. The particular rule may also include a particular queue exchange that specifies one or more queue messages to be generated.

As shown in 725, a queue message may be generated based on the queue exchange in the particular rule. As shown in 730, the queue message may be sent to a messaging service such as a queue service. In one embodiment, the queue message may be placed in one or more queues managed by the queue service and ultimately delivered to an appropriate recipient.

Figure 8:
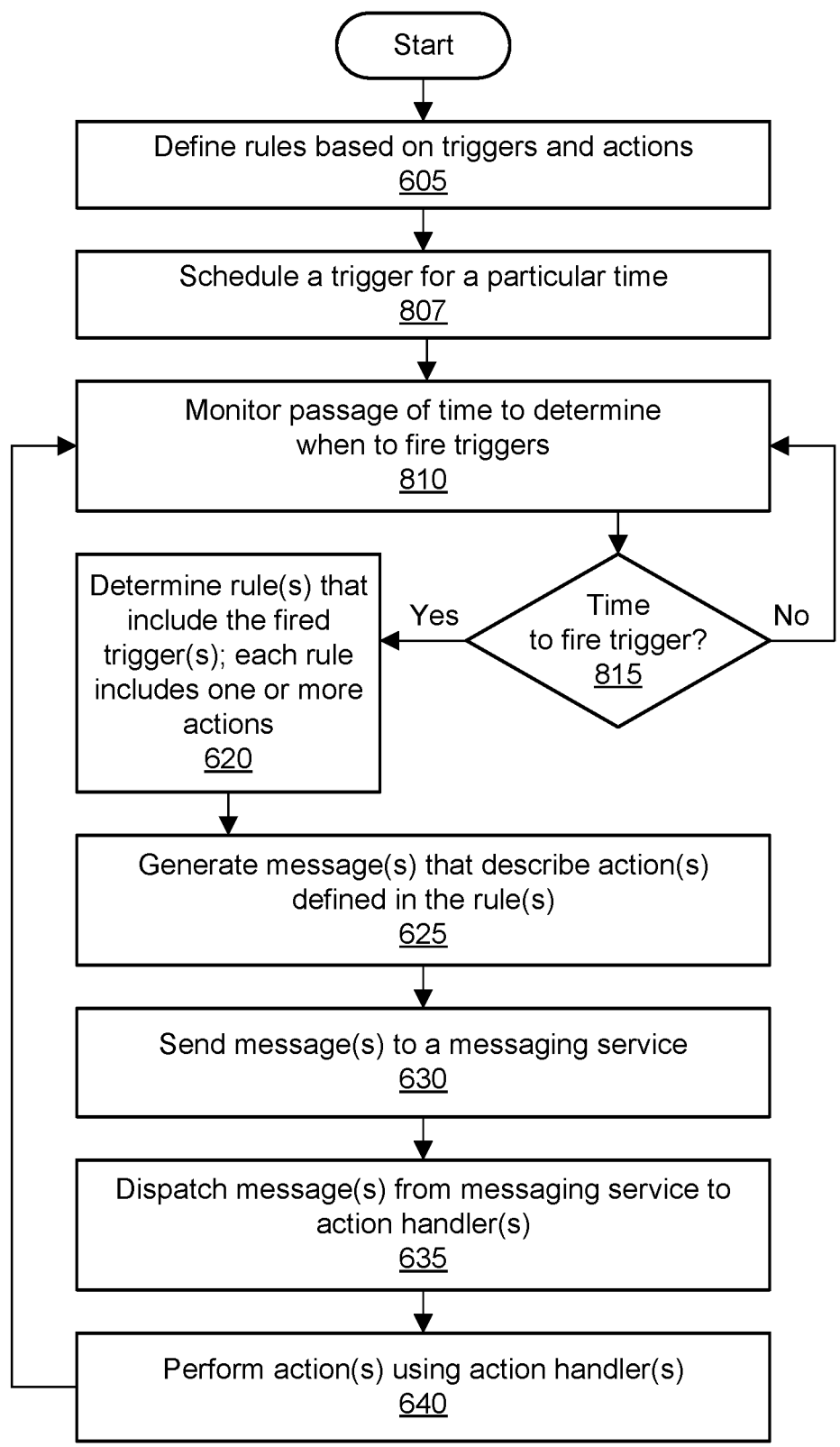
FIG. 8 is a flowchart illustrating a method for schedule-based action triggering in a provider network, according to some embodiments.

FIG. 8 is a flowchart illustrating a method for schedule-based action triggering in a provider network, according to some embodiments. As shown in 605, a plurality of rules may be defined based on a plurality of triggers and a plurality of actions. In one embodiment, a particular rule includes one or more of the triggers and one or more of the actions. Alternatively, a particular rule may include a trigger and a queue exchange. The triggers, actions, and/or rules may be defined or selected by a user using predefined elements and/or custom elements.

As shown in 807, a trigger may be scheduled for a particular time. The trigger may be scheduled as a one-time event or as a recurring event. For example, the trigger may be scheduled every day at the particular time, every seven days at a particular time, on a particular day of every month, or at any other suitable interval. The trigger may be scheduled automatically or based on user input. As shown in 810, the passage of time may be monitored in the provider network to determine when to fire any scheduled triggers.

As shown in 815, it may be determined, based on the monitoring, that the time has arrived for a particular scheduled trigger to be fired. If the time has arrived for a trigger, then a "fire trigger" request may be sent to a rule-based action triggering system, e.g., from an external agent, service, or other entity that performs the monitoring. As shown in 620, a particular one or more of the rules may be determined that include the particular scheduled trigger that was fired. The particular one or more rules may be determined in response to determining that the conditions are met for the particular scheduled trigger. The particular one or more rules may be determined by retrieving the rules from a data store based on the particular scheduled trigger defined within the rules. Each of the particular rule(s) may also include a particular one or more actions.

As shown in 625, one or more messages may be generated. The one or more messages may describe the particular one or more actions in the particular one or more rules that also include the particular scheduled trigger. As shown in 630, the one or more messages may be sent to a messaging service. In one embodiment, the messaging service may be implemented using a queue service, and the one or more messages may be placed in one or more queues managed by the queue service.

As shown in 635, the one or more messages may be dispatched from the messaging service to one or more action handlers. The action handler(s) may be part of an action execution environment. As shown in 640, the one or more action handlers may perform the one or more actions described in the one or more messages. In one embodiment, a performed action may result in another trigger being fired, such that the operations shown in 610 through 640 are performed again for a different trigger, different rule, and/or different action. In this manner, triggers may be chained to other triggers to perform complex chains of actions.

Routing Handler for Rule-Based Action Triggering

Figure 9:
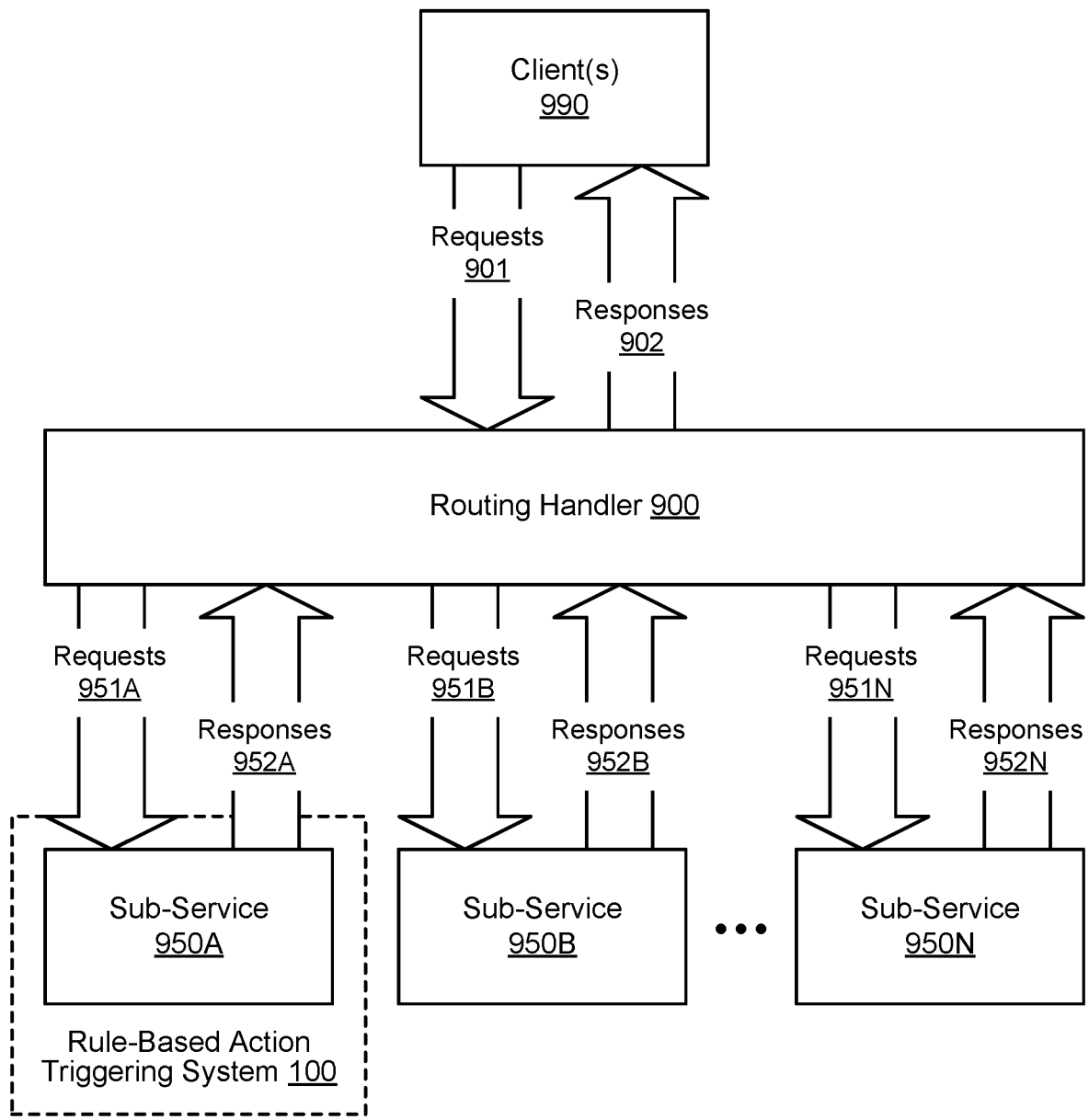
FIG. 9 illustrates an example system environment for a routing handler for rule-based action triggering, according to some embodiments.

FIG. 9 illustrates an example system environment for a routing handler for rule-based action triggering, according to some embodiments. A routing handler 900 may route requests to various ones of components discussed above, including components of the rule-based action triggering system 100 and other components used by the rule-based action triggering system 100. The routing handler 900 may also be referred to as a proxy for the rule-based action triggering system 100 and its related components. The components to which the routing handler 900 routes requests may be referred to herein as sub-services. The routing handler 900 may route an individual request to a selected sub-service of a plurality of sub-services, such as sub-services 950A and 950B through 950N. Although three sub-services 950A, 950B, and 950N are shown for purposes of illustration, it is contemplated that any suitable number and configuration of sub-services may be used. The sub-services 950A-950N may represent different sub-services or different versions of the same sub-service. As shown in the example of FIG. 9, one or more of the sub-services, such as sub-service 950A, may implement aspects of the functionality of the rule-based action triggering system 100. Others of the sub-services, such as sub-services 950B and 950N, may implement functionality that is invoked by or otherwise associated with the rule-based action triggering system 100. In this manner, the routing handler 900 may provide a unified customer experience for interactions with a variety of different sub-services 950A-950N that are associated with the rule-based action triggering and/or schedule-based action triggering discussed above. Additionally, routing information may be updated for a fleet of routing handlers without updating and/or redeploying the routing handlers themselves.

The routing handler 900 may receive requests 901 from one or more clients 990, e.g., over a network. The clients 990 may represent external customers of the organization that maintains the routing handler 900, internal customers of the organization that maintains the routing handler 900, or any suitable ones of the sub-services 950A-950N. Individual requests may specify operations to be performed by individual sub-services. As will be discussed in greater detail below, the routing handler 900 may determine which of the sub-services is the target of any particular request. The routing handler 900 may then route the request to that particular sub-service (e.g., to one or more hosts that implement the sub-service), over a network. If any response to the request is generated by the recipient sub-service, then the routing handler may receive the response and route it to the client that sent the request. As shown in the example of FIG. 9, the routing handler 900 may send requests 951A and receive responses 952A from sub-service 950A, may send requests 951B and receive responses 952B from sub-service 950B, and may send requests 951N and receive responses 952N from sub-service 950N. The requests 901 received from the client may collectively represent the requests 951A-951N routed to the sub-services 950A-950N. The responses 902 routed to the client may collectively represent the responses 952A-952N received from the sub-services 950A-950N.

The routing handler 900 may be implemented using one or more computing devices, any of which may be implemented by the example computing device 3000 illustrated in FIG. 16. In various embodiments, portions of the functionality of the routing handler 900 may be provided by the same computing device or by any suitable number of different computing devices. If any of the components of the routing handler 900 are implemented using different computing devices, then the components and their respective computing devices may be communicatively coupled, e.g., via a network. The routing handler 900 may be part of a fleet of routing handlers. Others in the fleet of routing handlers may be similarly configured and/or provide similar functionality.

Each of the sub-services 950A-950N may also be implemented using one or more computing devices, any of which may be implemented by the example computing device 3000 illustrated in FIG. 16. In various embodiments, the functionality of any of the sub-services 950A-950N may be provided by the same computing device or by any suitable number of different computing devices. If any of the components of one of the sub-services 950A-950N are implemented using different computing devices, then the components and their respective computing devices may be communicatively coupled, e.g., via a network.

Figure 10:
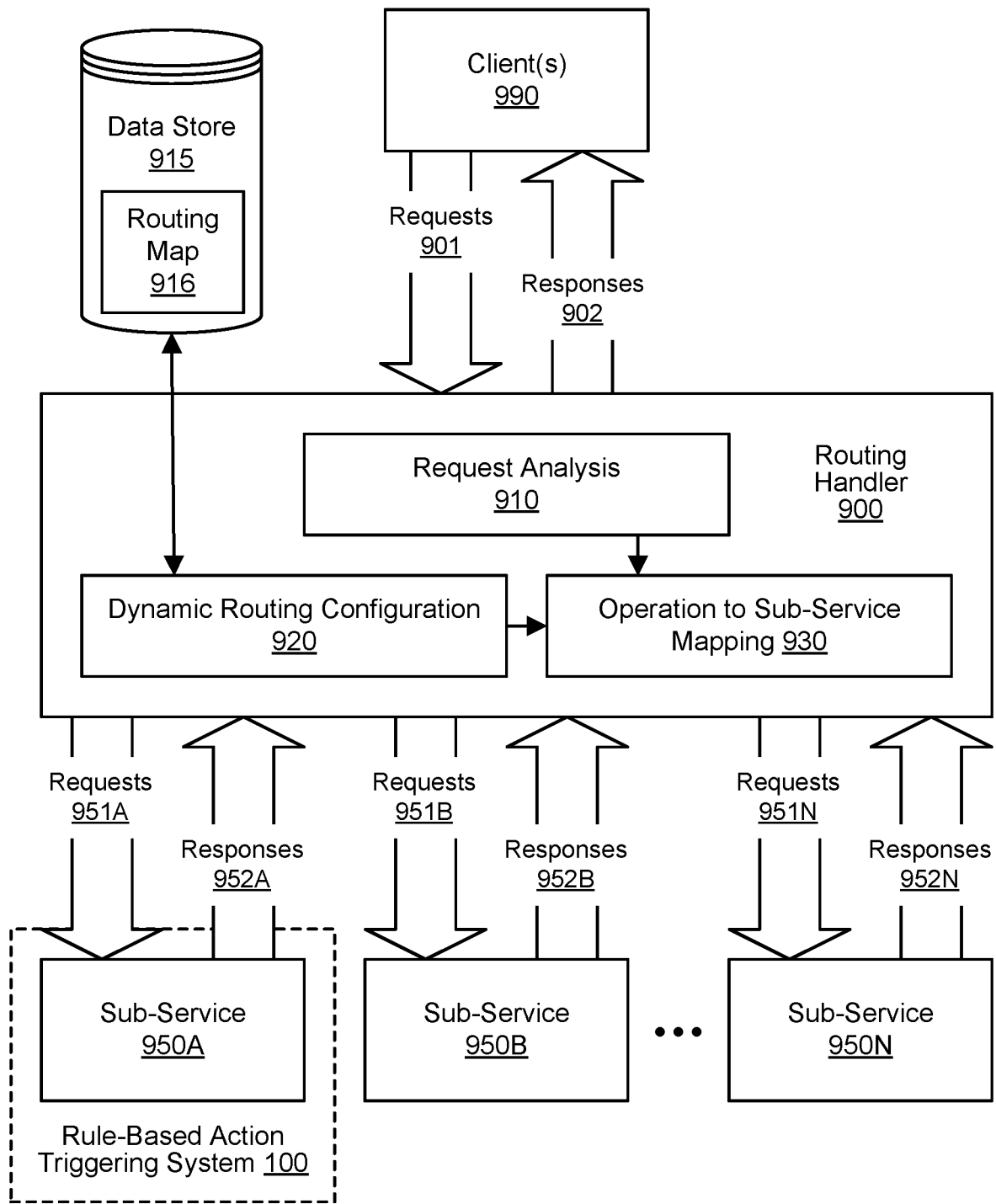
FIG. 10 illustrates further aspects of the example system environment for a routing handler for rule-based action triggering, including use of a dynamically loaded routing map, according to some embodiments.

FIG. 10 illustrates further aspects of the example system environment for a routing handler for rule-based action triggering, including use of a dynamically loaded routing map, according to some embodiments. The routing handler 900 may use a routing map 916 retrieved from an external data store 915 to map particular operations in requests to particular sub-services. The data store 915 may be implemented using any suitable storage technologies. In one embodiment, the routing handler 900 may include a request analysis functionality 910, a dynamic routing configuration functionality 920, and an operation to sub-service mapping functionality 930. It is contemplated that the routing handler 900 may include additional components not shown, fewer components than shown, or different combinations, configurations, or quantities of the components shown.

In one embodiment, the request analysis functionality 910 may perform request analysis on incoming requests 901. Using any suitable technique(s), the request analysis functionality 910 may determine the one or more operations specified in an incoming request. For example, the incoming request may be received as an HTTP (HyperText Transport Protocol) request, and the operation(s) may be specified in a particular portion of the HTTP request. The various operations may represent various APIs (application programming interfaces) offered by the various sub-services.

In one embodiment, the dynamic routing configuration functionality 920 may maintain an up-to-date routing map 916. The routing map 916 may be retrieved from the external data store 915 at appropriate intervals and cached by the dynamic routing configuration functionality 920. The routing map 916 may be dynamically loaded at the routing handler 900, e.g., loaded during execution of the routing handler without needing to update the program code for the routing handler, redeploy the routing handler, or restart the routing handler. The routing map 916 may represent a mapping of particular operation names (or other identifiers) to particular sub-services that provide those operations. The routing map 916 may be implemented using a key-value data store in which the keys represent operation names (or other identifiers) and the associated values represent sub-service names (or other identifiers). In one embodiment, a plurality of routing handlers (e.g., in a fleet of routing handlers) may refer to the same routing map 916, e.g., by caching different copies of the routing map.

In one embodiment, the operation to sub-service mapping functionality 930 may use the routing map 916 to determine the particular sub-service to which an incoming request should be routed. The operation to sub-service mapping functionality 930 may look up the particular operation (as determined by the request analysis functionality 910) in the routing table 916 (as provided by the dynamic routing configuration functionality 920) to determine the particular sub-service that provides the operation named in the request. The routing handler 900 may then route the request to the appropriate sub-service as determined by the operation to sub-service mapping functionality 930. Any responses received by the routing handler 900 from the sub-service may be routed to the client that sent the request. A fleet of hosts may implement a particular sub-service, and routing the request to the sub-service may include routing the request to a load balancer associated with the sub-service. The load balancer may then route the request to a particular host.

Figure 11:
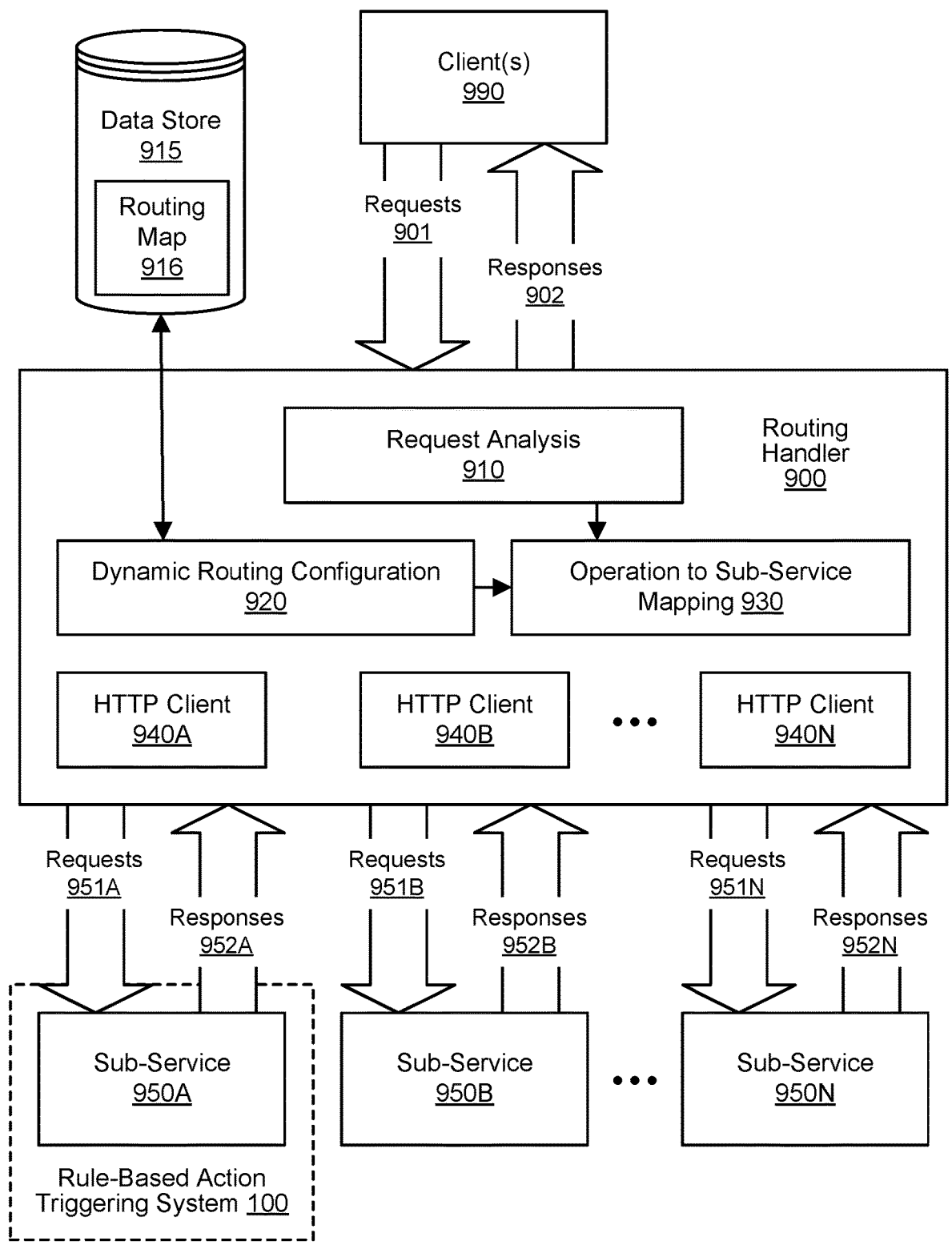
FIG. 11 illustrates further aspects of the example system environment for a routing handler for rule-based action triggering, including use of HTTP clients for particular sub-services, according to some embodiments.

FIG. 11 illustrates further aspects of the example system environment for a routing handler for rule-based action triggering, including use of HTTP clients for particular sub-services, according to some embodiments. In one embodiment, the requests 901 may be expressed as HTTP requests, and the routing handler 900 may use a plurality of HTTP clients to communicate with the sub-services 950A-950N. In one embodiment, the routing handler 900 may use one HTTP client per sub-service or per sub-service host. As shown in the example of FIG. 11, the routing handler 900 may use one HTTP client 940A to communicate with sub-service 950A, another HTTP client 940B to communicate with sub-service 950B, and yet another HTTP client 940N to communicate with sub-service 950N. However, it is contemplated that any suitable number and configuration of HTTP clients may be used. Any of the HTTP clients 940A-940N may be created (e.g., instantiated) or re-used when the routing handler 900 seeks to route a request to the corresponding one of the sub-services 950A-950N.

In one embodiment, an HTTP client may perform in a synchronous mode in which the HTTP client waits for a response after forwarding a request to one of the sub-services. In one embodiment, one or more of the HTTP clients may instead perform in an asynchronous mode. In the asynchronous mode, one or more threads in an HTTP client may be returned to a thread pool after the one or more threads have been used to route a request to a sub-service. One or more queues may be used by the routing handler 900 to receive responses from the sub-services. Using asynchronous input/output (I/O) in this manner, resources at the routing handler 900 may be used more efficiently.

Figure 12:
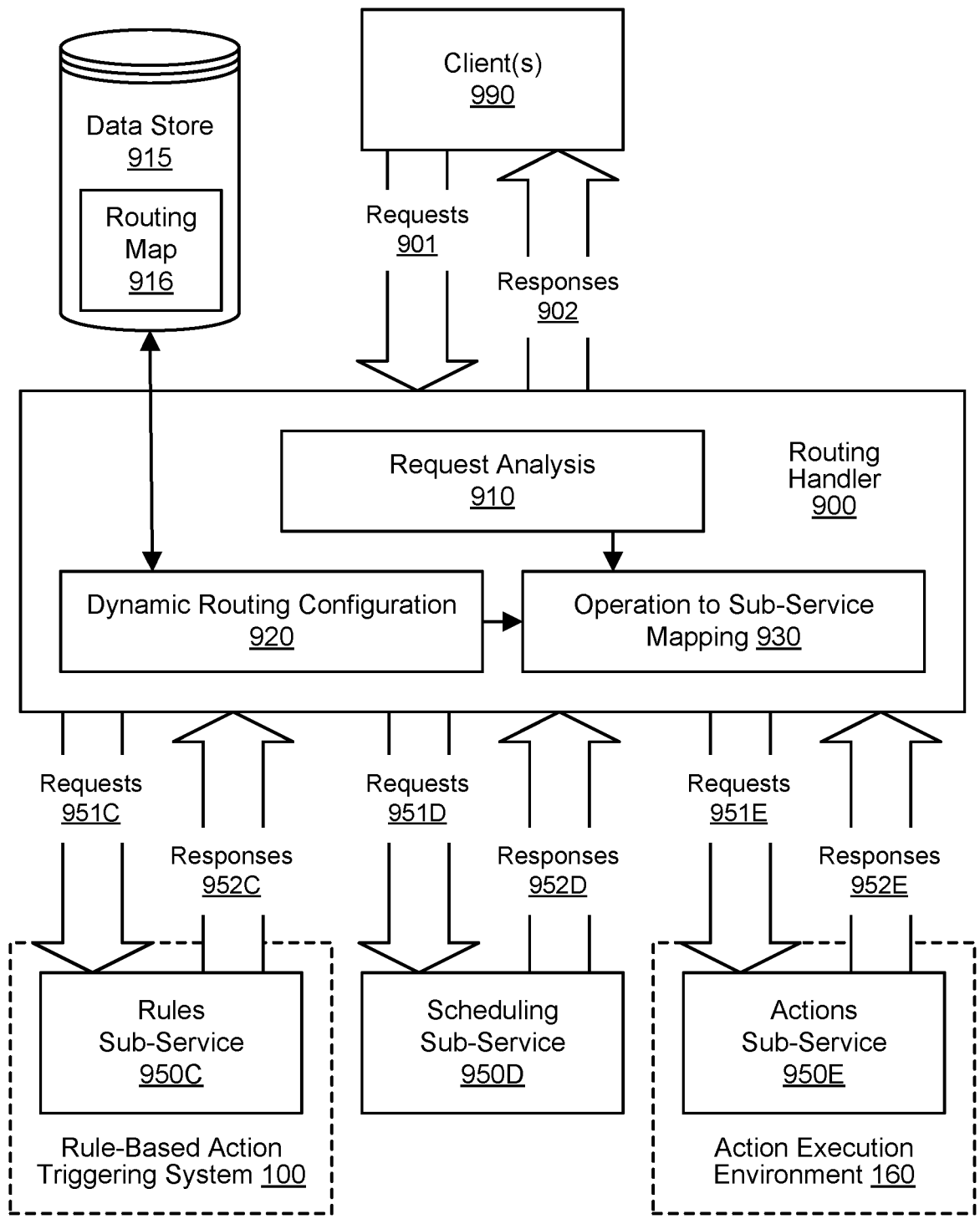
FIG. 12 illustrates further aspects of the example system environment for a routing handler for rule-based action triggering, including examples of sub-services, according to some embodiments.

FIG. 12 illustrates further aspects of the example system environment for a routing handler for rule-based action triggering, including examples of sub-services, according to some embodiments. In various embodiments, the sub-services may include sub-services for rule-based action triggering, scheduling actions, performing actions based on the rules, and/or any other suitable tasks. As shown in the example of FIG. 12, the routing handler 900 may route requests to a rules sub-service 950C, a scheduling sub-service 950D, and an actions sub-service 950E. The rules sub-service 950C may represent the functionality described above for the rule-based action triggering system 100, e.g., as discussed above with respect to FIG. 1, FIG. 2, and FIG. 3. For example, the rules sub-service 950C may define rules that bind triggers to actions and may fire triggers to cause actions to be performed based on rules. The rules sub-service 950C may receive requests 951C routed from the routing handler 900 and send responses 952C to the routing handler. The scheduling sub-service 950D may schedule actions to be performed at particular times, e.g., as discussed above with respect to FIG. 8. The scheduling sub-service 950D may receive requests 951D routed from the routing handler 900 and send responses 952D to the routing handler. The actions sub-service 950E may represent the functionality described above for the action handlers 161A-161N and/or action execution environment 160, e.g., as discussed above with respect to FIG. 1, FIG. 2, and FIG. 3. For example, the actions sub-service 950E may perform rule-based and/or schedule-based actions on resources 171A-171N in the provider network 170. The actions sub-service 950E may receive requests 951E routed from the routing handler 900 and send responses 952E to the routing handler.

Figure 13:
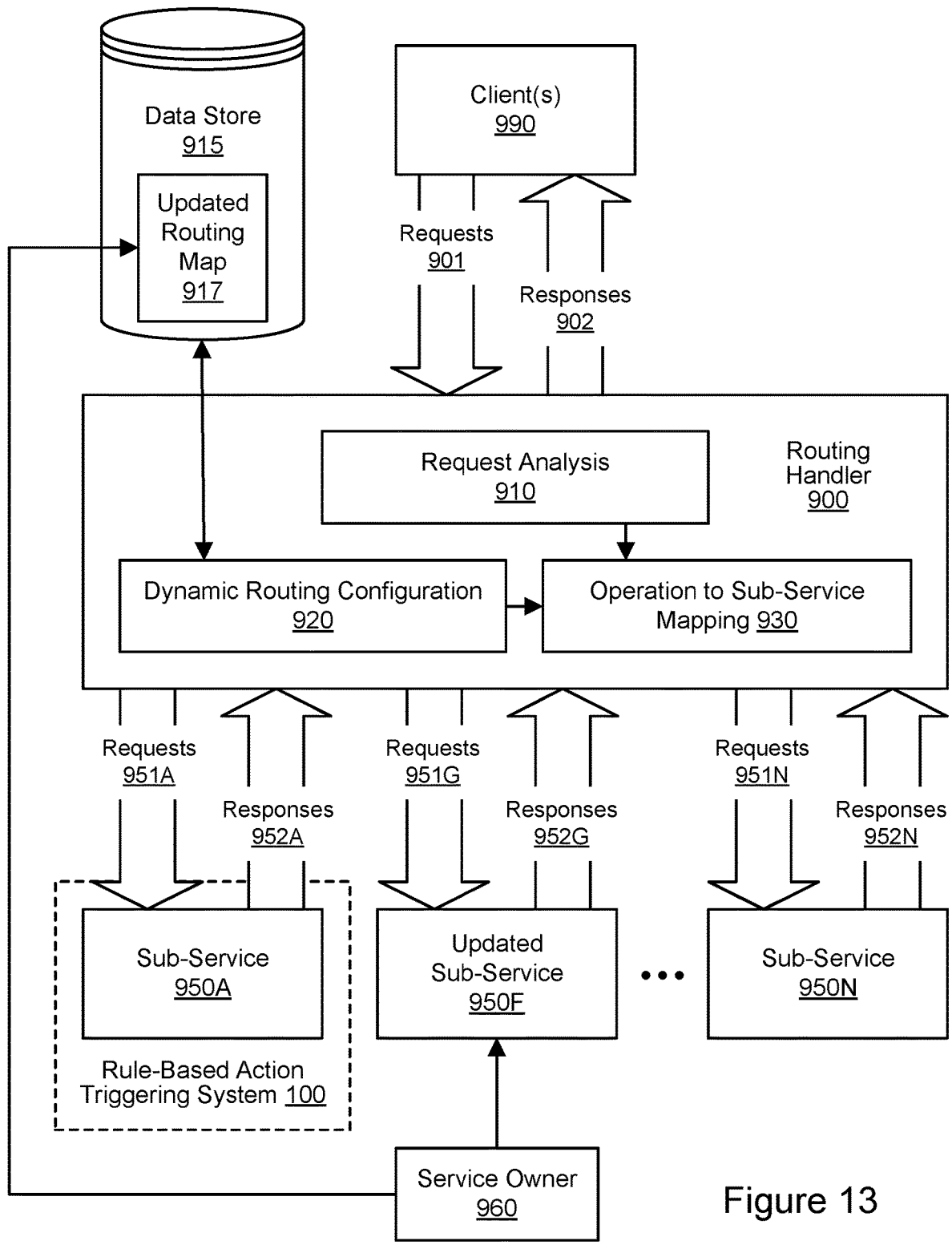
FIG. 13 illustrates further aspects of the example system environment for a routing handler for rule-based action triggering, including updating the routing map to reflect updates to a sub-service, according to some embodiments.

FIG. 13 illustrates further aspects of the example system environment for a routing handler for rule-based action triggering, including updating the routing map to reflect updates to a sub-service, according to some embodiments. When one or more operations at a particular sub-service are updated, the routing map may be updated instead of the routing handler itself. The routing handler may be part of a fleet of routing handlers. By updating the routing map instead of the entire fleet of routing handlers, updates to sub-services may be implemented efficiently. Accordingly, as shown in FIG. 13, an updated sub-service 950F may replace or supplement another sub-service (e.g., sub-service 950B). In comparison to an earlier version used with the routing handler 900, the updated sub-service 950F may implement and offer to clients: one or more additional operations, one or more fewer operations, and/or one or more modified operations. The modified operations may reflect differences in operation names (or other identifiers) and/or parameters associated with operations. In one embodiment, a service owner 960 may be responsible for updating the updated sub-service 950F and adding the updated sub-service 950F to the set of sub-services whose traffic is managed by the routing handler 900. When the updated sub-service 950F is added to the set of sub-services managed by the routing handler 900, the service owner 960 may also produce an updated routing map 917. The updated routing map 917 may represent a mapping of particular operation names (or other identifiers) to particular sub-services that provide those operations, including the updated operations for the updated sub-service 950F. The service owner 960 may store the updated routing map 917 in the data store 915. In one embodiment, the service owner 960 may provide any suitable security credentials in order to overwrite the out-of-date routing map 916 with the updated routing map 917 in the data store 915.

Figure 14:
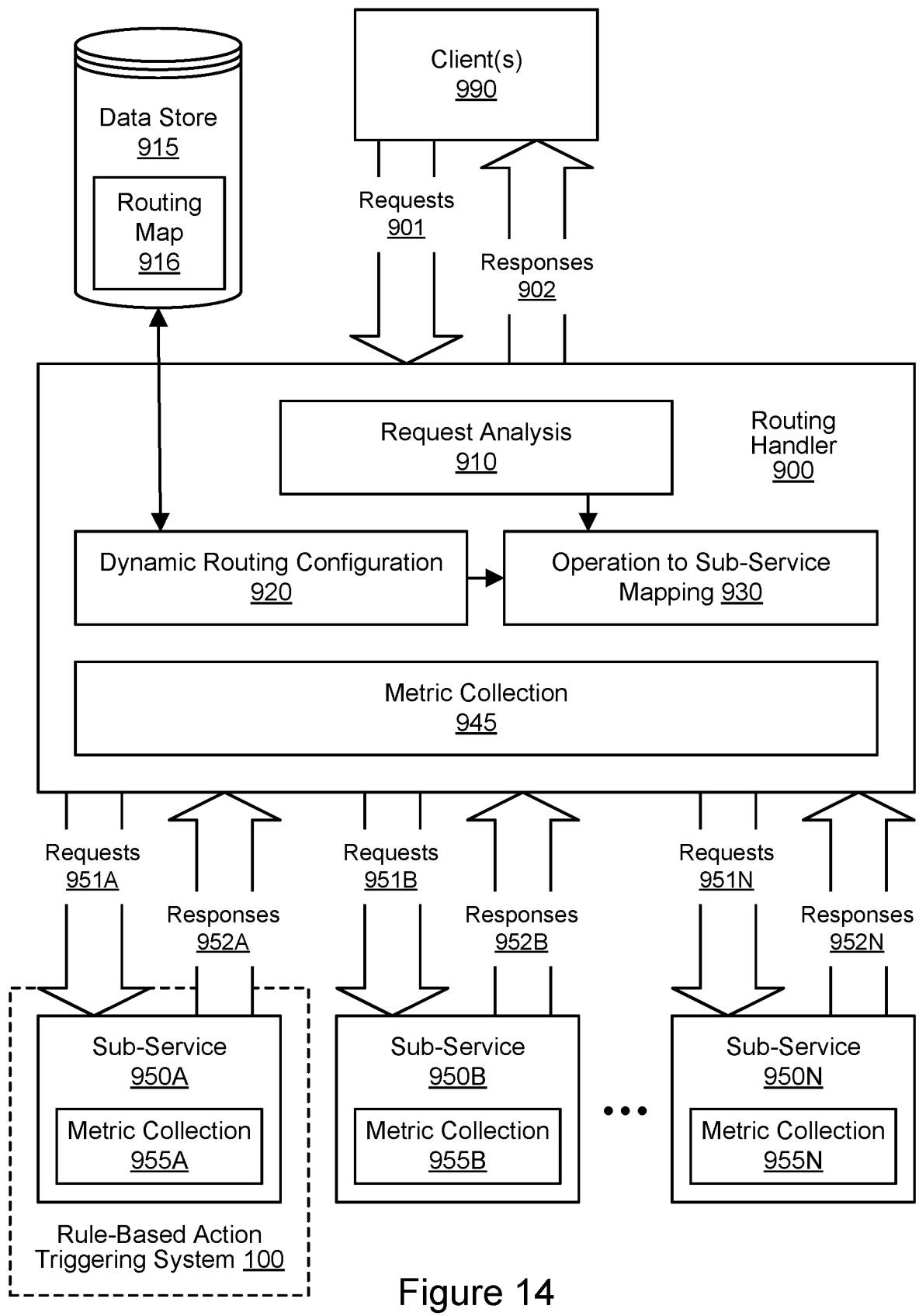
FIG. 14 illustrates further aspects of the example system environment for a routing handler for rule-based action triggering, including metric collection at sub-services and the routing handler, according to some embodiments.

FIG. 14 illustrates further aspects of the example system environment for a routing handler for rule-based action triggering, including metric collection at sub-services and the routing handler, according to some embodiments. In one embodiment, the individual sub-services 950A-950N may collect performance metrics related to the receipt and/or processing of the requests 901. As shown in the example of FIG. 14, sub-service 950A may include a metric collection functionality 955A, sub-service 950B may include a metric collection functionality 955B, and sub-service 950N may include a metric collection functionality 955N. The routing handler 900 may also include a metric collection functionality 945 for collecting performance metrics related to the various tasks it performs, including routing requests 901 and responses 902. The collected metrics may relate to network usage, processor usage, memory usage, storage usage, power usage, and/or other resource usage. The various metric collection functionalities 955A-955N and 945 may report the collected metrics to any suitable component for aggregation and/or analysis. For example, to measure end-to-end latency for the routing and processing of a request, latency metrics for the request may be collected from both the routing handler 900 and the recipient sub-service.

In one embodiment, individual ones of the sub-services 950A-950N may represent different versions of the same sub-service. For example, two of the sub-services 950A-950N may represent an earlier version of the rules sub-service and a newer version of the rules sub-service. The routing handler 900 may assist in AB testing of the two versions of the same sub-service by routing some requests to one version and other requests to the other version. The requests may be routed based on client whitelists and/or client blacklists. In one embodiment, the metric collection functionalities at the corresponding sub-services as well as the metric collection functionality 945 at the routing handler 900 may be used to assess the results of the testing, e.g., by determining the relative performance of the two different versions of the same sub-service.

Figure 15:
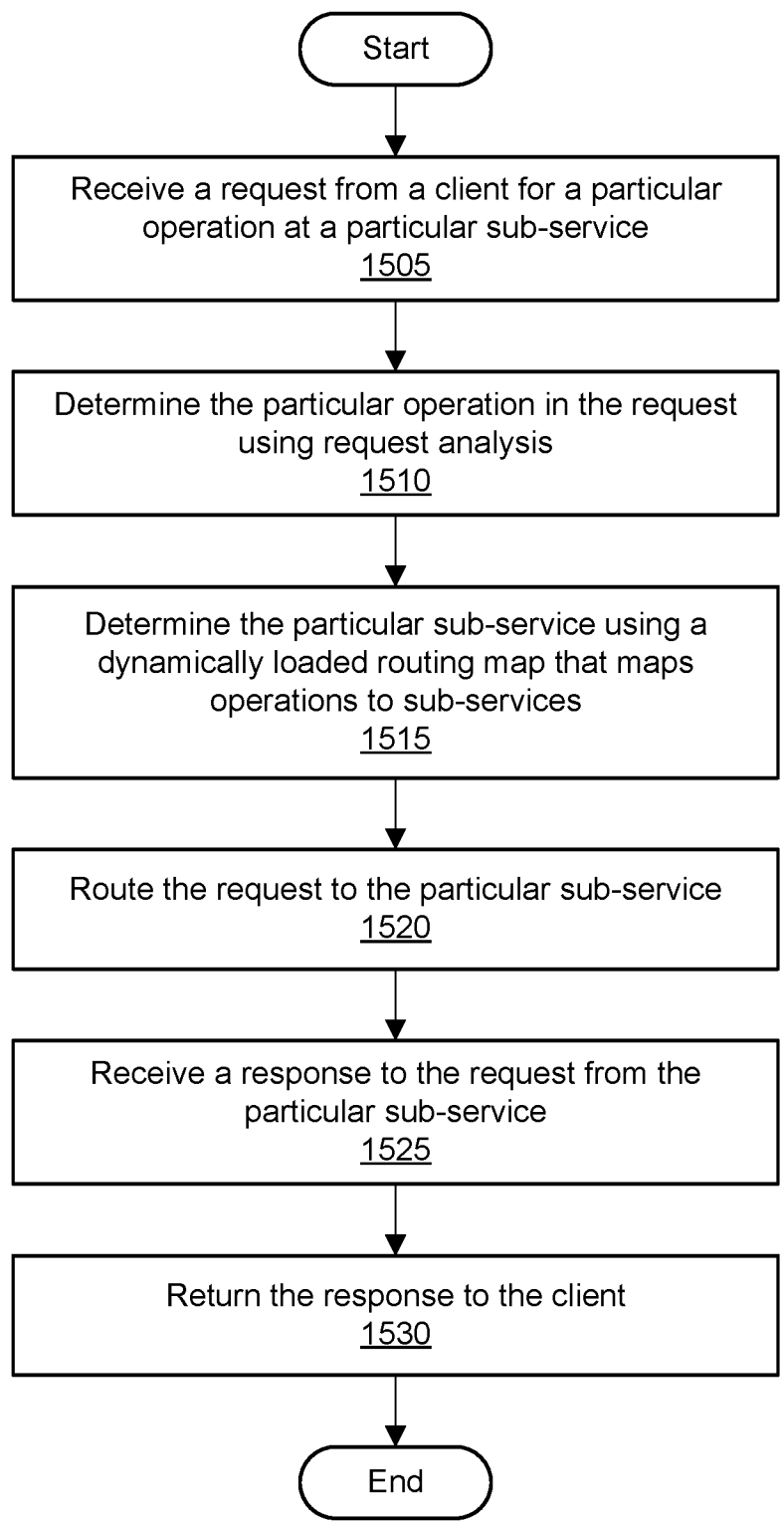
FIG. 15 is a flowchart illustrating a method for using a routing handler for rule-based action triggering, according to some embodiments.

FIG. 15 is a flowchart illustrating a method for using a routing handler for rule-based action triggering, according to some embodiments. As shown in 1505, a request may be received from a client at a request router. The request may specify a particular operation at a particular sub-service. As shown in 1510, the particular operation in the request may be determined. In one embodiment, the particular operation may be determined using request analysis, e.g., to identify the operation name (or other identifier) in an HTTP request.

As shown in 1515, the particular one of the sub-services may be determined based on the particular operation. The particular one of the sub-services may be determined using a routing map that represents associations between operation names (or other identifiers) and sub-service names (or other identifiers). The routing map may be dynamically loaded from a data store so that each routing handler in a fleet has up-to-date routing information.

As shown in 1520, the request may be routed from the routing handler to the particular sub-service. As shown in 1525, a response to the request may be received at the routing handler from the particular sub-service. As shown in 1530, the response may be returned from the routing handler to the client.

Illustrative Computer System

In at least some embodiments, a computer system that implements a portion or all of one or more of the technologies described herein may include a general-purpose computer system that includes or is configured to access one or more computer-readable media. FIG. 16 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 16 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
   one or more processors and one or more memories to store computer-executable instructions that, when executed, cause the one or more processors to:
      define, according to configuration input from a client of a cloud computing provider, an alert rule that indicates one or more conditions to perform one or more actions on one or more target resources provided to the client, wherein the cloud computing provider is configured to provide a plurality of resources to a plurality of clients, and wherein the plurality of resources comprise the one or more target resources;
      monitor, via the cloud computing provider, one or more signals emitted by the plurality of resources;
      determine that the one or more conditions of the alert rule are met by the one or more signals;
      determine that the one or more actions are to be performed on the one or more target resources according to the alert rule, based at least in part on the one or more conditions being met by the one or more signals;
      send one or more messages describing the one or more actions to a messaging service, wherein the messaging service causes the one or more messages to be delivered to one or more action handlers; and
      perform, using the one or more action handlers, the one or more actions on the one or more target resources provided to the client by the cloud computing provider.

2. The system as recited in claim 1, wherein the one or more signals are based on contents of one or more service logs.

3. The system as recited in claim 1, wherein the one or more signals comprise one or more metric values.

4. The system as recited in claim 1, wherein the one or more signals comprise one or more data items in a data stream.

5. The system as recited in claim 1, wherein performing the one or more actions comprises invoking one or more functions executed by the cloud computing provider.

6. The system as recited in claim 1, wherein the messaging service is implemented using one or more queues.

7. A computer-implemented method, comprising:
   defining, according to configuration input from a client of a cloud computing provider, an alert rule that indicates one or more conditions to perform one or more actions on one or more target resources provided to the client, wherein the cloud computing provider is configured to provide a plurality of resources to a plurality of clients, and wherein the plurality of resources comprise the one or more target resources;
   monitoring, via the cloud computing provider, one or more signals emitted by the plurality of resources;
   determining that the one or more conditions of the alert rule are met by the one or more signals;
   determining that the one or more actions are to be performed on the one or more target resources according to the alert rule, based at least in part on the one or more conditions being met by the one or more signals;

sending one or more messages describing the one or more actions to a messaging service, wherein the messaging service causes the one or more messages to be delivered to one or more action handlers; and performing, using the one or more action handlers, the one or more actions on the one or more target resources provided to the client by the cloud computing provider.

8. The method as recited in claim 7, wherein the one or more signals are based on contents of one or more service logs.

9. The method as recited in claim 7, wherein the one or more signals comprise one or more metric values.

10. The method as recited in claim 7, wherein the one or more signals comprise one or more data items in a data stream.

11. The method as recited in claim 7, wherein performing the one or more actions comprises invoking one or more functions executed by the cloud computing provider.

12. The method as recited in claim 7, wherein the messaging service is implemented using one or more queues.

13. The method as recited in claim 7, further comprising:
monitoring, via the cloud computing provider, one or more additional signals emitted by the plurality of resources responsive to the one or more actions;
determining that one or more additional conditions of an additional alert rule are met by the one or more additional signals;
determining one or more additional actions to be performed on one or more additional target resources according to the additional alert rule, based at least in part on the one or more additional conditions being met by the one or more additional signals; and
performing the one or more additional actions.

14. One or more non-transitory computer-readable storage media storing program instructions that, when executed on or across one or more processors, perform:
defining, according to configuration input from a client of a cloud computing provider, an alert rule that indicates one or more conditions to perform one or more actions on one or more target resources provided to the client, wherein the cloud computing provider is configured to provide a plurality of resources to a plurality of clients, and wherein the plurality of resources comprise the one or more target resources;
monitoring, via the cloud computing provider, one or more signals emitted by the plurality of resources;
determining that the one or more conditions of the alert rule are met by the one or more signals;
determining that the one or more actions are to be performed on the one or more target resources according to the alert rule, based at least in part on the one or more conditions being met by the one or more signals;
sending one or more messages describing the one or more actions to a messaging service, wherein the messaging service causes the one or more messages to be delivered to one or more action handlers; and
performing, using the one or more action handlers, the one or more actions on the one or more target resources provided to the client by the cloud computing provider.

15. The one or more non-transitory computer-readable storage media as recited in claim 14, wherein the one or more signals are based on contents of one or more service logs.

16. The one or more non-transitory computer-readable storage media as recited in claim 14, wherein the one or more signals comprise one or more metric values.

17. The one or more non-transitory computer-readable storage media as recited in claim 14, wherein the one or more signals comprise one or more data items in a data stream.

18. The one or more non-transitory computer-readable storage media as recited in claim 14, wherein performing the one or more actions comprises invoking one or more functions executed by the cloud computing provider.

19. The one or more non-transitory computer-readable storage media as recited in claim 14, wherein the messaging service is implemented using one or more queues.

20. The one or more non-transitory computer-readable storage media as recited in claim 14, further comprising additional program instructions that, when executed on or across the one or more processors, perform:
monitoring, via the cloud computing provider, one or more additional signals emitted by the plurality of resources responsive to the one or more actions;
determining that one or more additional conditions of an additional alert rule are met by the one or more additional signals;
determining an additional action group comprising one or more additional actions to be performed on one or more additional target resources according to the additional alert rule, wherein the additional action group is determined based at least in part on the one or more additional conditions met by the one or more additional signals; and
performing the one or more additional actions of the additional action group.

\* \* \* \* \*